(12) United States Patent
Frasnetti et al.

(10) Patent No.: US 11,279,506 B2
(45) Date of Patent: Mar. 22, 2022

(54) WRAPPING MACHINE AND METHOD

(71) Applicant: Fabio Perini S.p.A., Lucca (IT)

(72) Inventors: Luca Frasnetti, Montecarlo (IT); Fabio Pattuzzi, Bologna (IT); Daniele Bolognesi, Ozzano dell'Emilia (IT)

(73) Assignee: Fabio Perini S.p.A., Lucca (IT)

( * ) Notice: Subject to any disclaimer, the term of this patent is extended or adjusted under 35 U.S.C. 154(b) by 207 days.

(21) Appl. No.: 16/613,509

(22) PCT Filed: May 11, 2018

(86) PCT No.: PCT/EP2018/062241
§ 371 (c)(1),
(2) Date: Nov. 14, 2019

(87) PCT Pub. No.: WO2018/210698
PCT Pub. Date: Nov. 22, 2018

(65) Prior Publication Data
US 2021/0155358 A1    May 27, 2021

(30) Foreign Application Priority Data

May 16, 2017   (IT) .................. 102017000052911
Oct. 9, 2017   (IT) .................. 102017000113370

(51) Int. Cl.
*B65B 25/14*    (2006.01)
*B65B 59/00*    (2006.01)
(Continued)

(52) U.S. Cl.
CPC ............ *B65B 25/146* (2013.01); *B65B 11/22* (2013.01); *B65B 35/44* (2013.01); *B65B 59/001* (2019.05);
(Continued)

(58) Field of Classification Search
CPC ....... B65B 11/22; B65B 25/146; B65B 35/44; B65B 59/001; B65B 59/005; B65B 59/04;
(Continued)

(56) References Cited

U.S. PATENT DOCUMENTS 5,337,887 A * 8/1994 Greenwell ............. B65G 17/26
                                                198/473.1
5,465,550 A * 11/1995 Dall'Omo ............... B65B 59/04
                                                  53/224

(Continued)

FOREIGN PATENT DOCUMENTS

| EP | 1067048 A1 | 1/2001 |
|----|------------|--------|
| EP | 1312549 A1 | 5/2003 |
| WO | 2011000427 A1 | 1/2011 |
| WO | 2011009485 A1 | 1/2011 |

*Primary Examiner* — Gene O Crawford
*Assistant Examiner* — Keith R Campbell
(74) *Attorney, Agent, or Firm* — Breiner & Breiner, L.L.C.

(57) ABSTRACT

The wrapping machine includes a feed path of products to be wrapped in a wrapping sheet. An insertion station of products to be wrapped in a wrapping sheet, and folding members of the wrapping sheet are arranged along the feed path. A conveyor device receives the products in the insertion station and causes their feed through the folding members. The conveyor device includes a system of endless flexible members that define a closed trajectory along which carriages move. The machine also includes a magazine of carriages associated with the system of flexible members and manipulators adapted to pick up carriages from the magazine and attach them to the system of flexible members, and to pick up carriages from the system of flexible members and place them in the magazine.

31 Claims, 28 Drawing Sheets

(51) Int. Cl.
*B65B 11/22* (2006.01)
*B65B 35/44* (2006.01)
*B65B 59/04* (2006.01)
*B65G 47/84* (2006.01)

(52) U.S. Cl.
CPC ............ *B65B 59/005* (2013.01); *B65B 59/04* (2013.01); *B65G 47/841* (2013.01); *B65G 2201/0214* (2013.01); *B65G 2201/06* (2013.01)

(58) Field of Classification Search
CPC ................ B65G 19/245; B65G 47/841; B65G 2201/0214; B65G 2201/06
See application file for complete search history.

(56) References Cited

U.S. PATENT DOCUMENTS

| | | | |
|---|---|---|---|
| 6,067,780 A * | 5/2000 | Gentili | B65B 59/003 53/504 |
| 6,308,497 B1 | 10/2001 | Cassoli et al. | |
| 6,799,410 B2 * | 10/2004 | Gamberini | B65B 59/001 53/233 |
| 7,789,219 B2 | 9/2010 | Baldanza et al. | |
| 8,727,106 B2 * | 5/2014 | Bernardi | B65B 59/005 198/803.1 |
| 2005/0229546 A1 | 10/2005 | Poli et al. | |
| 2012/0199447 A1 * | 8/2012 | Bernardi | B65G 17/26 198/867.02 |
| 2014/0260087 A1 | 9/2014 | Antoniazzi et al. | |
| 2020/0071007 A1 * | 3/2020 | Frasnetti | B65G 19/245 |

* cited by examiner

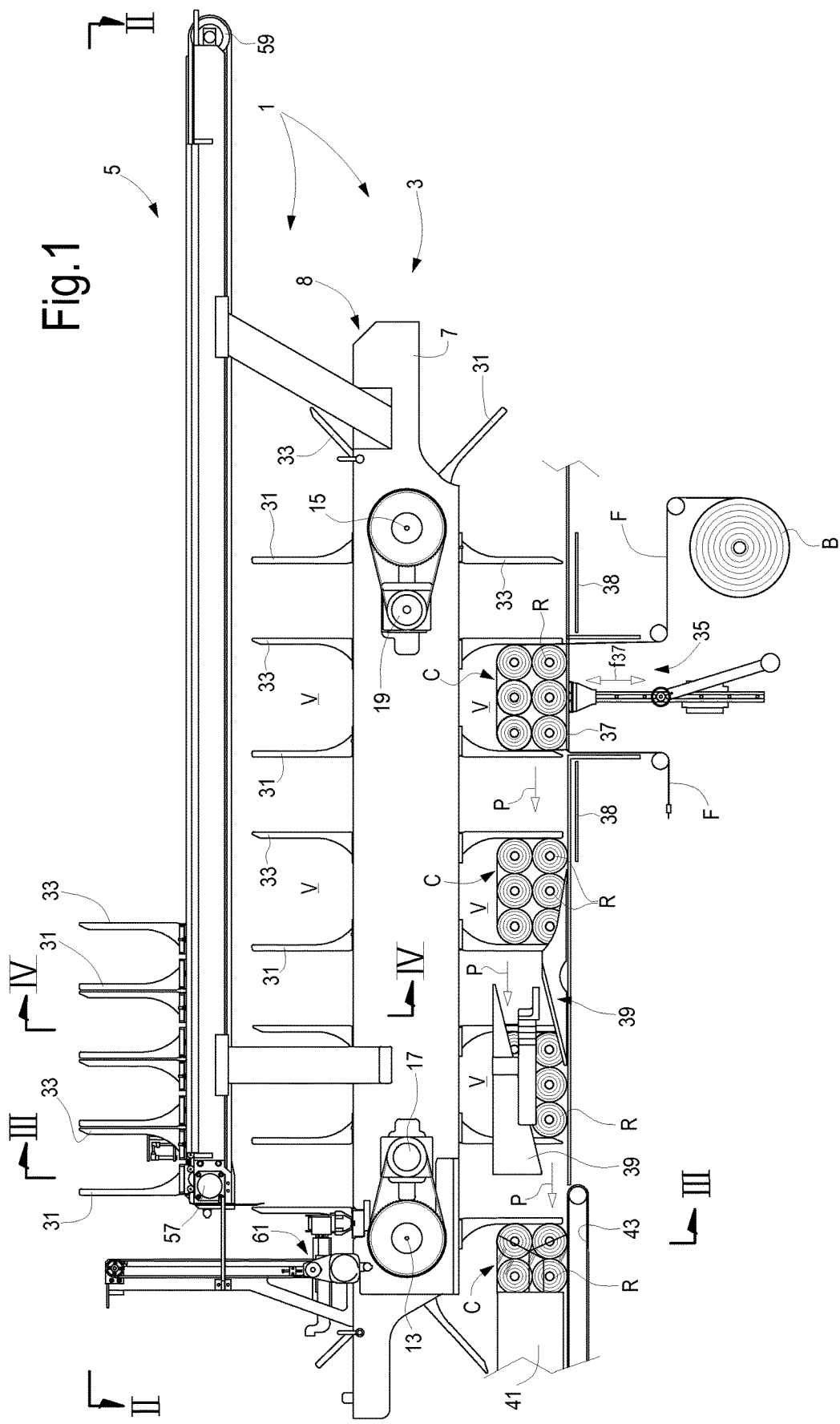

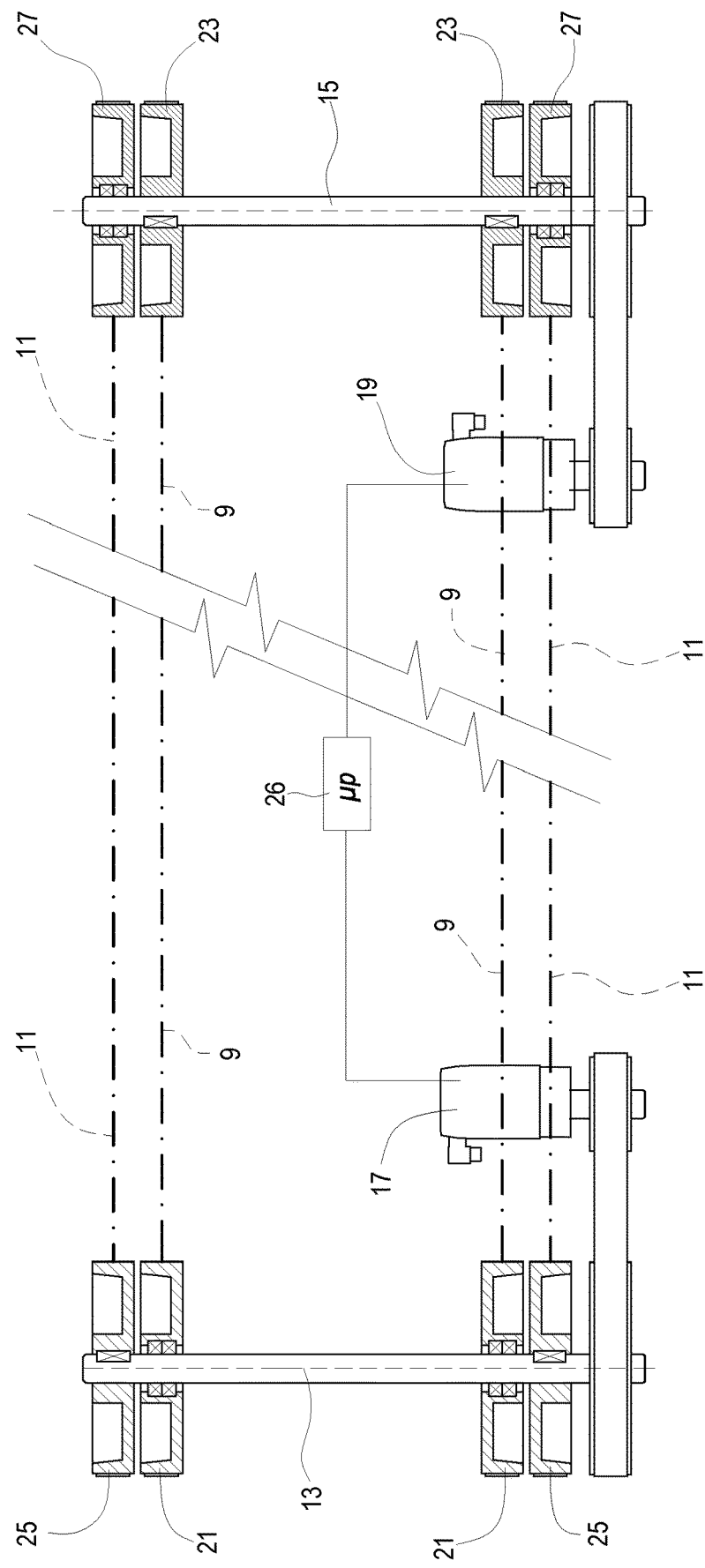

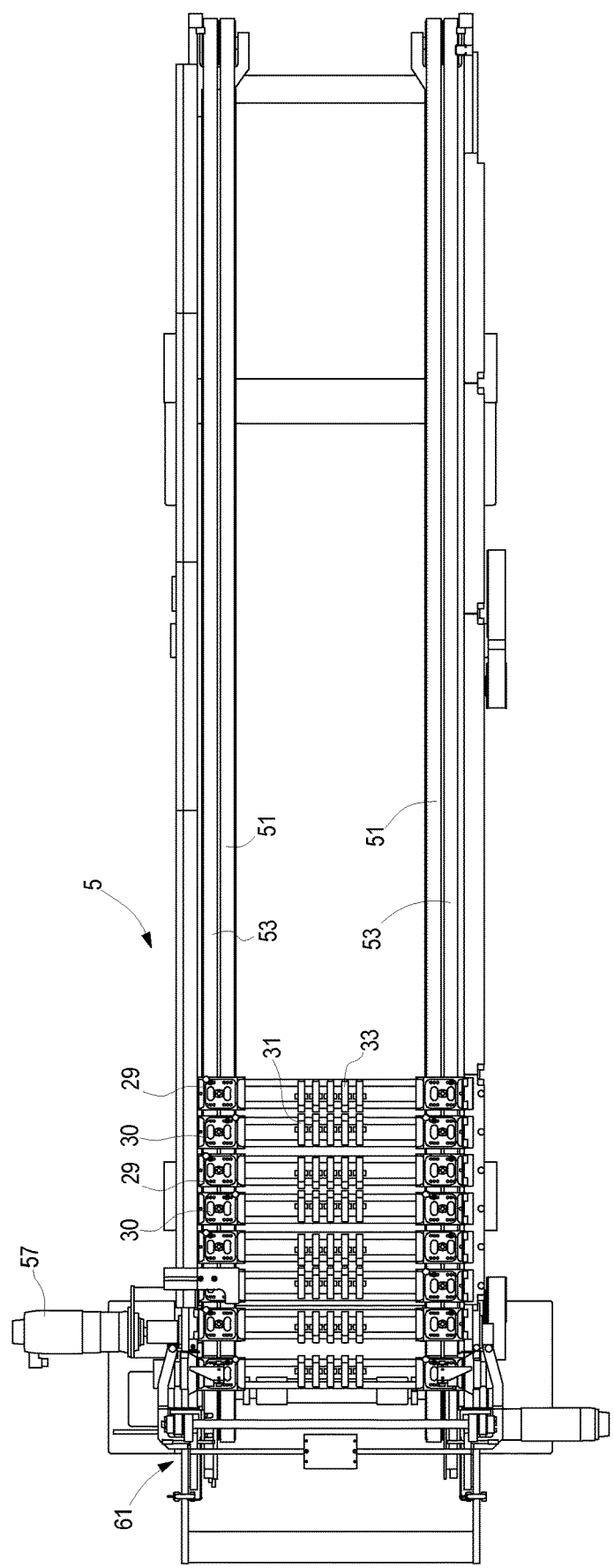

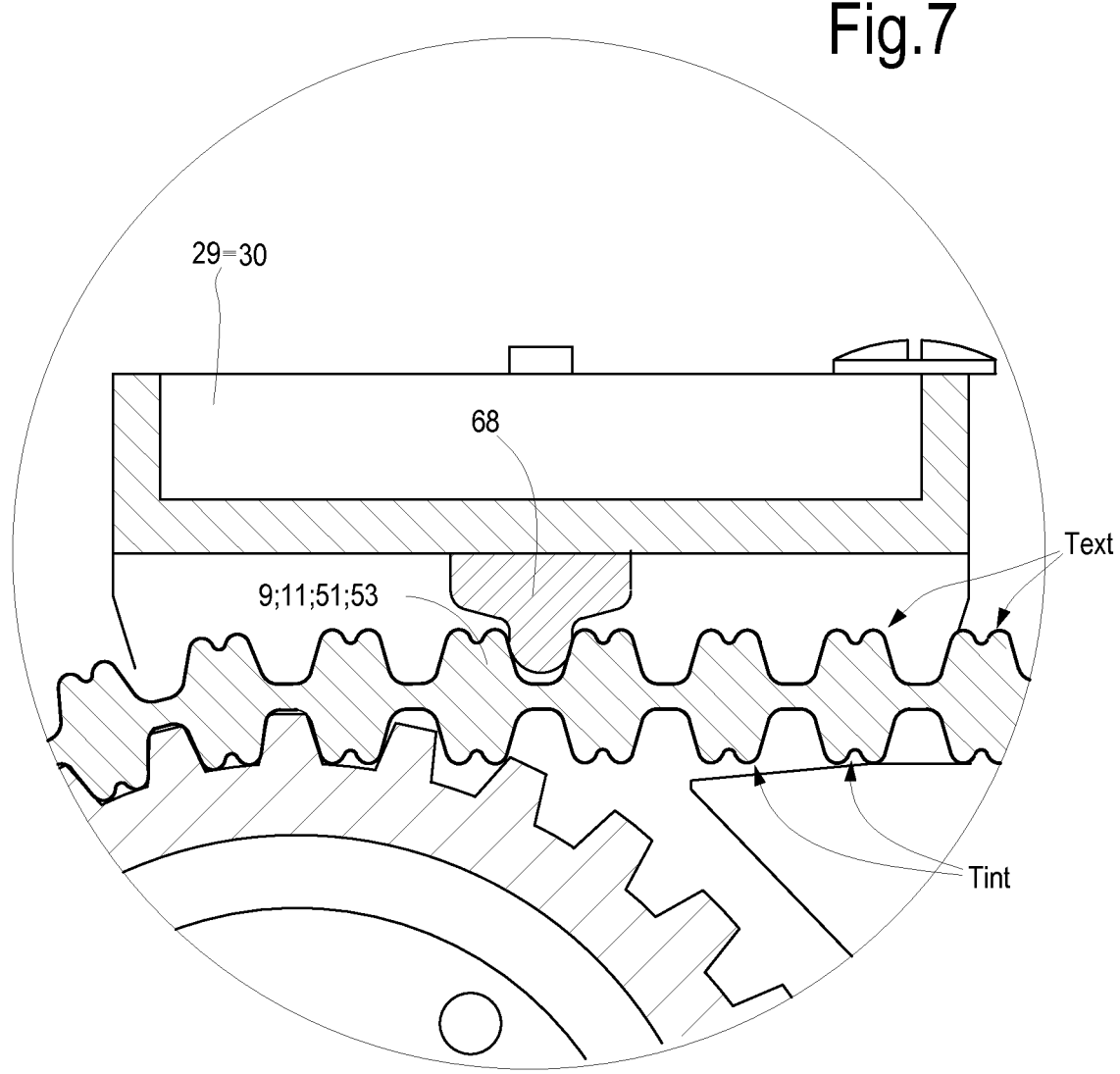
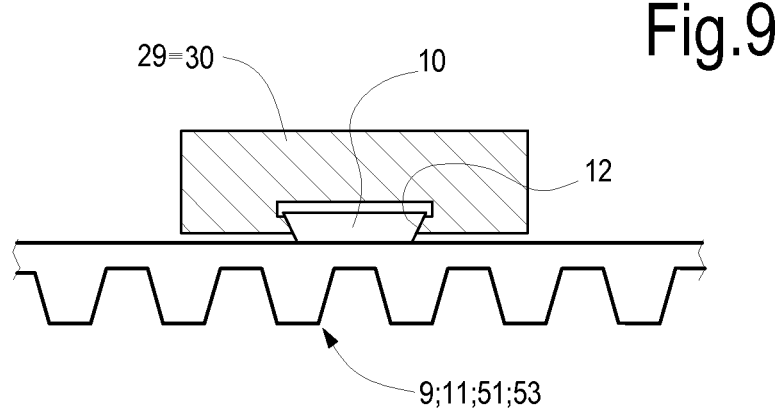

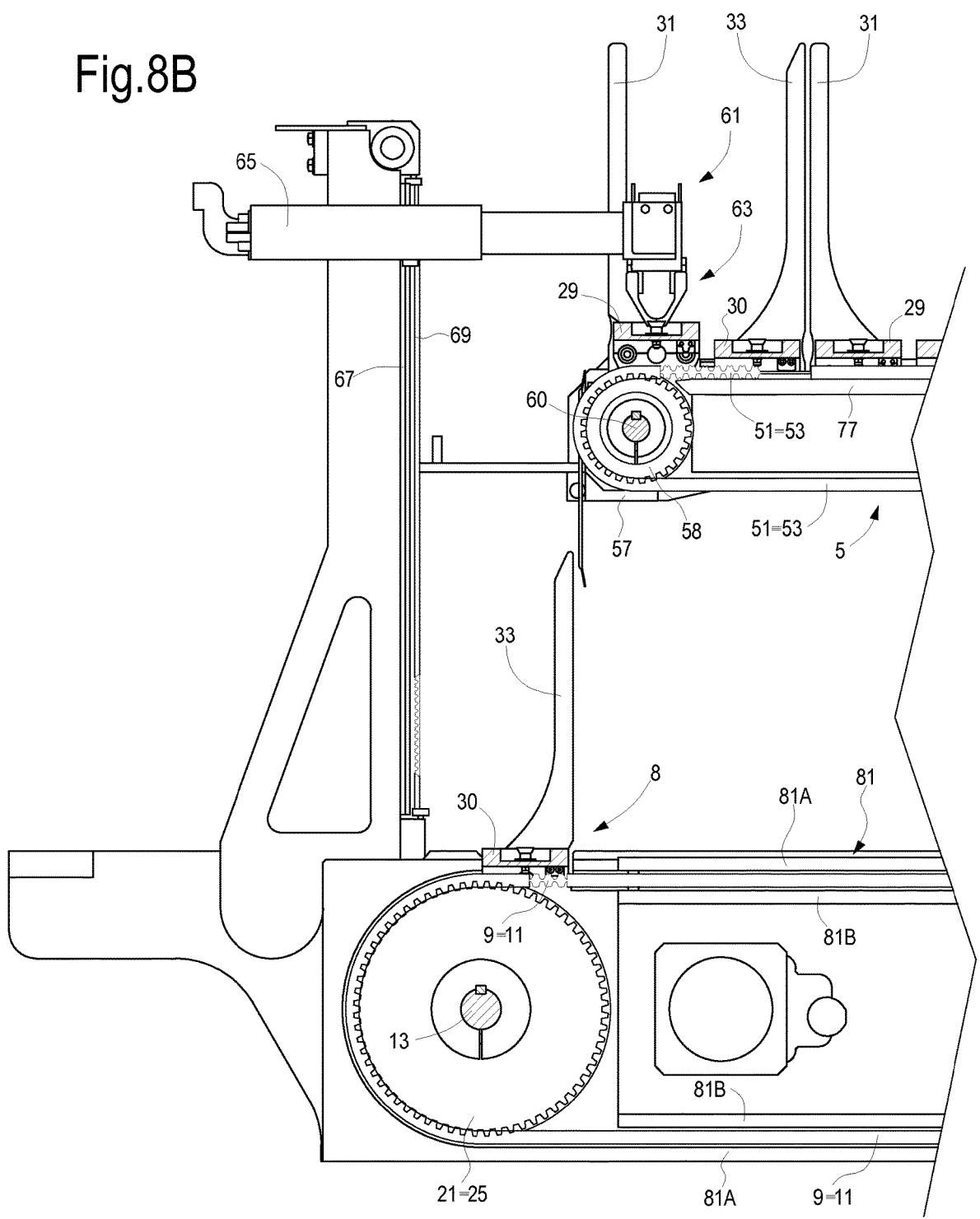

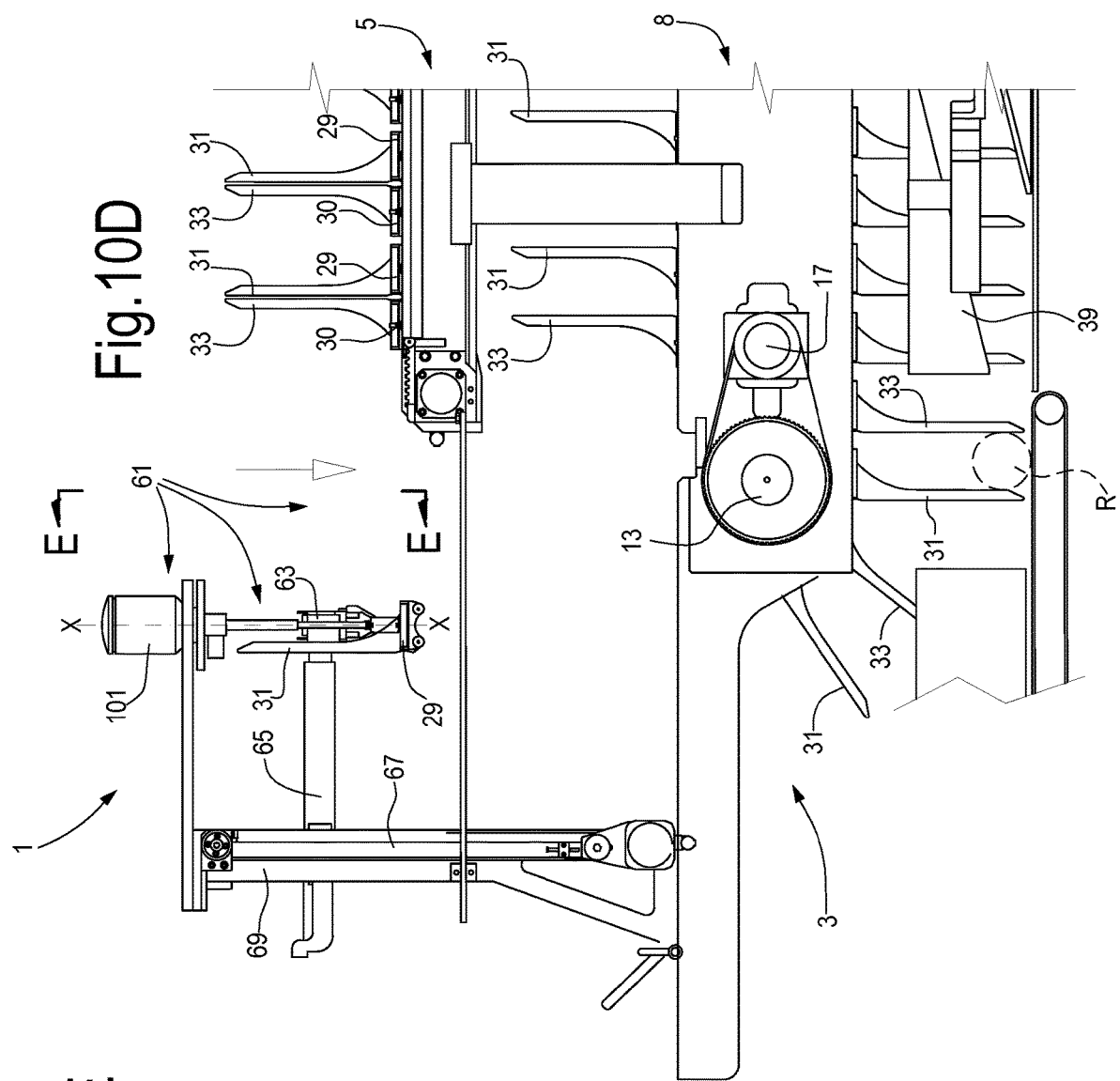
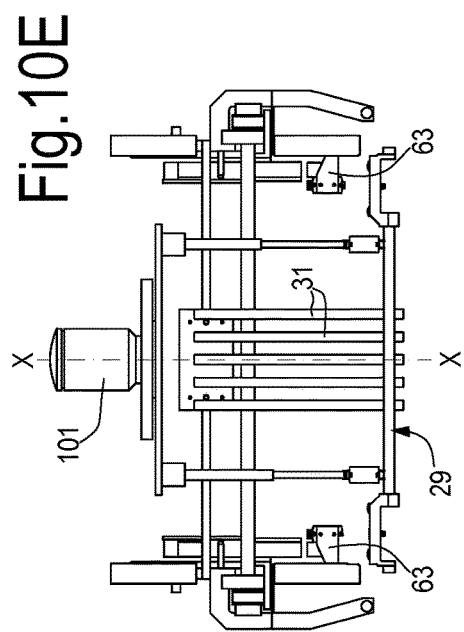

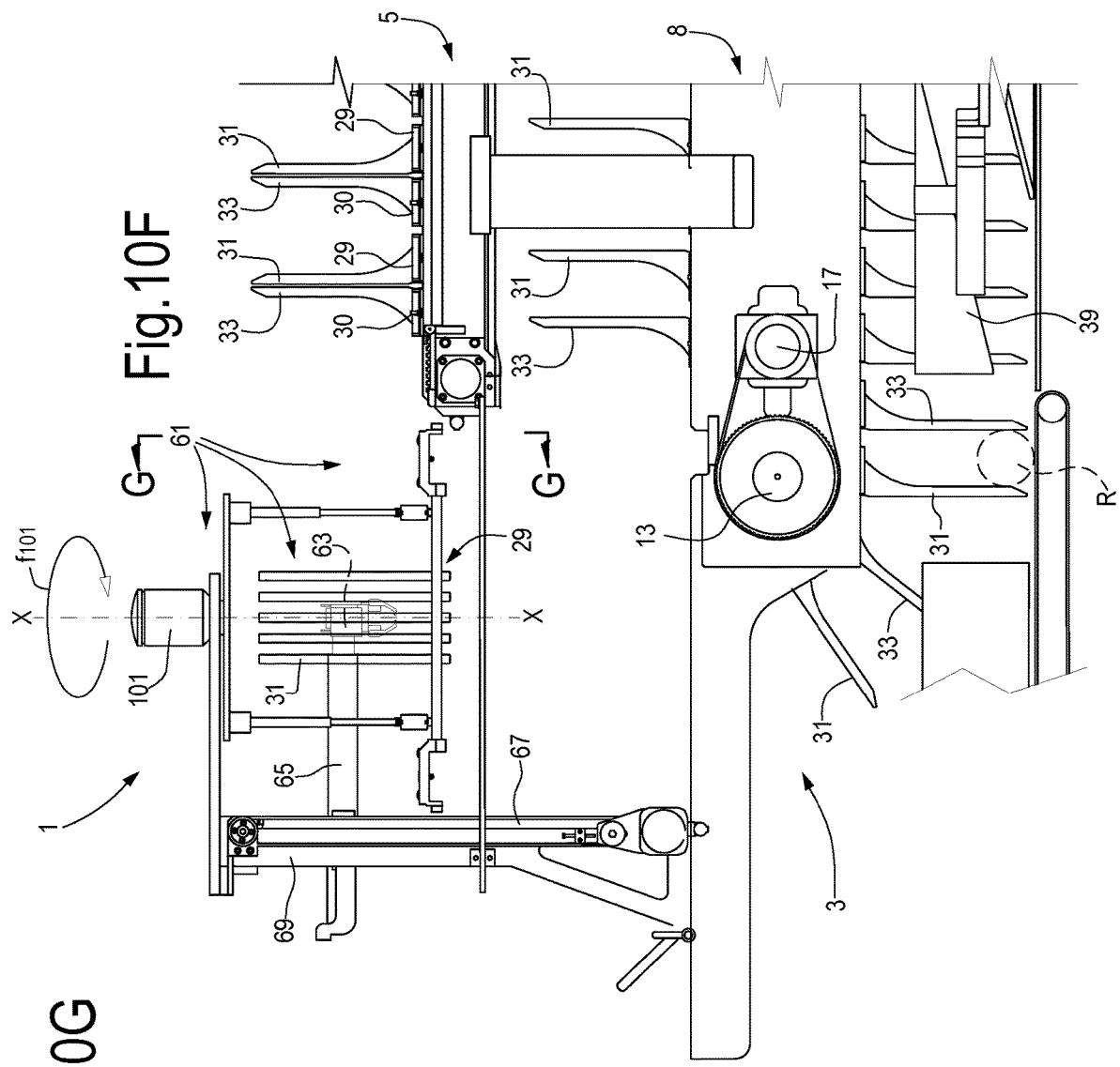
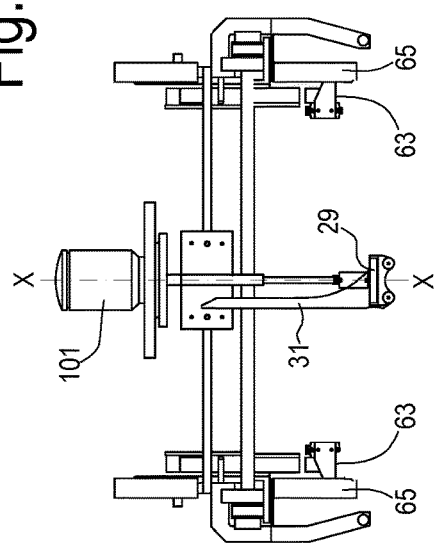

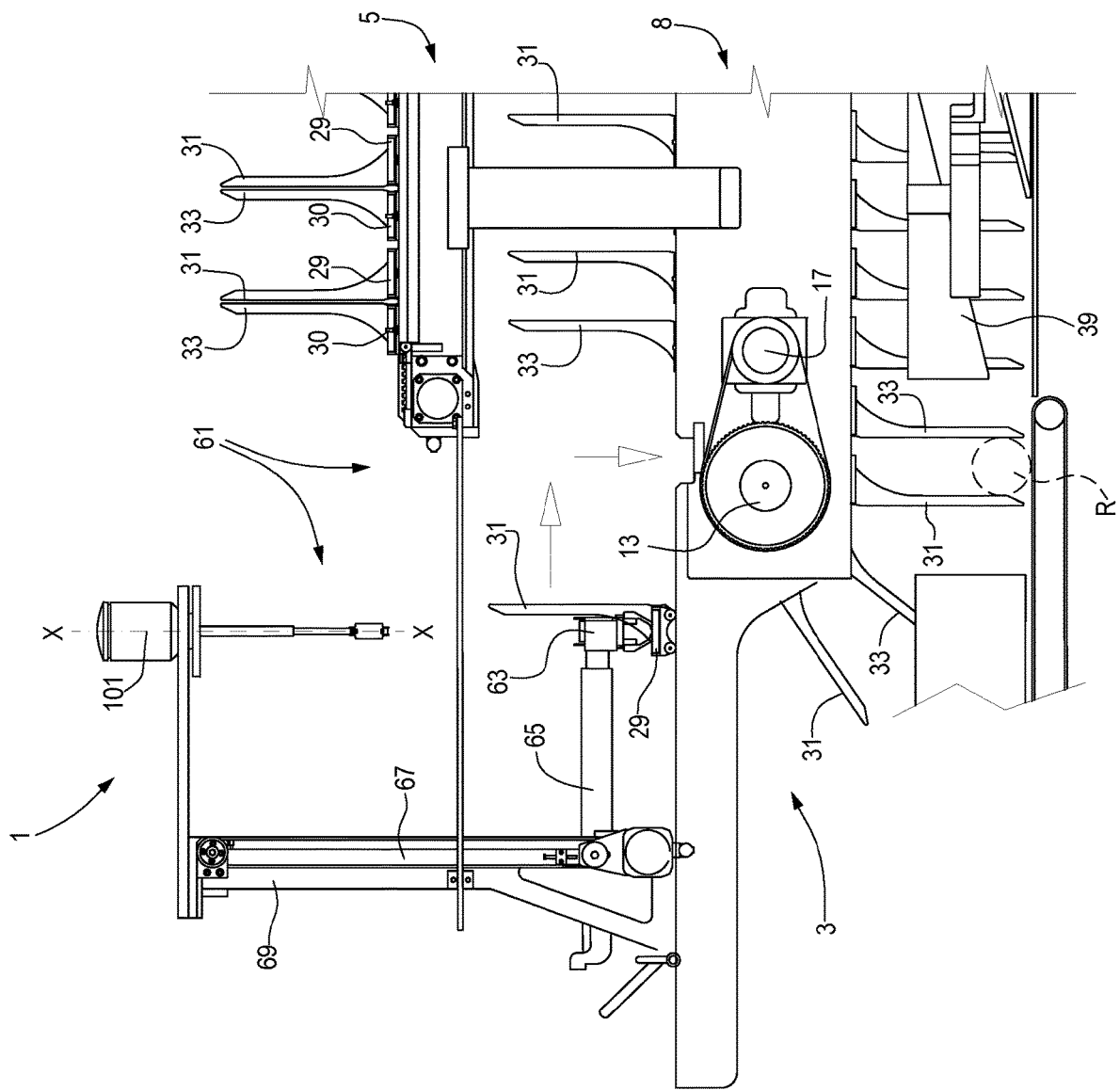

WRAPPING MACHINE AND METHOD

TECHNICAL FIELD

The invention relates to wrapping machines, for producing packs of products wrapped in wrapping sheets. The invention also relates to a method for setting up a wrapping machine.

STATE OF THE ART

In many industrial fields wrapping machines are used for wrapping one or more products, for example a group of ordered products, in wrapping sheets, to obtain packs intended for sale. For example, machines of this type are used in production lines of rolls of tissue paper, such as toilet tissue or kitchen towel.

Wrapping machines are described, for example, in US-A-2014/0260087; EP-A-1067048; U.S. Pat. No. 6,308,497; US-A-2005/0229546; U.S. Pat. Nos. 6,799,410 and 7,789,219.

Some wrapping machines of the current art comprise a feed path of products to be wrapped in a wrapping sheet and, along the feed path, an insertion station for introducing products to be wrapped in a wrapping sheet. Downstream of the product insertion station folding members of the wrapping sheet for wrapping the wrapping sheet around the products are provided. The products are fed along the feed path by means of a conveyor device, which receives the products in the insertion station and causes their feed through the folding members. In known machines the conveyor device comprises a system of flexible members that define a closed trajectory, along which carriages constrained to the flexible members and provided with prongs or fingers move. Pairs of consecutive and adjacent carriages define compartments for accommodating products to be wrapped.

The sizes of the packs to be produced vary greatly. In fact, they depend on the size of the single products and on the number of products per pack. Each time the type of pack to be produced changes, the wrapping machine must be set up again. During set-up a number of carriages must be attached to the flexible members at a suitable mutual distance. Number of carriages and mutual distance depend on the characteristics of the pack. For this purpose, each wrapping machine is usually provided with a given number of carriages. The operator sets up the machine removing all the carriages used for a previous production cycle and replacing them with an appropriate number of carriages at a suitable mutual distance for the production of the subsequent production cycle. Optionally, a single carriage remains fastened to the conveyor device to define a zero point, relative to which the other carriages are positioned, so as to allow them to be placed correctly synchronized.

These operations are lengthy and must be carried out by skilled personnel. Therefore, they affect the production cost and the overall productivity of the plant.

Consequently, there is a need to provide a machine and a set-up method that entirely or partially solve the problems of the state of the art.

SUMMARY OF THE INVENTION

According to one aspect, a wrapping machine is described, comprising a feed path of products to be wrapped in a wrapping sheet. Along the feed path an insertion station of products to be wrapped in a wrapping sheet can be arranged and, downstream of the insertion station, along the aforesaid feed path, folding members of the wrapping sheet can be provided. The machine further comprises a conveyor device, which receives the products in the insertion station and causes their feed through the folding members. The conveyor device can comprise a system of flexible members that defines a closed trajectory along which carriages move constrained to the flexible members and provided with prongs. Pairs of consecutive and adjacent carriages define compartments for accommodating products to be wrapped.

The wrapping machine further comprises a magazine of carriages associated with the system of flexible members. Manipulators are provided, adapted to pick up carriages from the magazine and attach them to the system of flexible members, and to pick up carriages from the system of flexible members and place them in the magazine.

The magazine allows the provision of a total number of carriages greater or the same as the number of carriages required for the manipulation of a specific type of packs. In fact, the total number of carriages that must be attached along the conveyor device depends in particular on the size of the packs of products that must be handled each time. Packs of larger sizes require a smaller number of carriages fastened along the system of flexible members. Packs of smaller sizes require a greater number of carriages fastened along the system of flexible members. When passing from the processing of one type of pack to the processing of a pack of different type, it is usually necessary to change the number and the position of the carriages. With the machine described herein these operations become much simpler and faster and can be automated. A programmable control unit can be provided to manage the manipulators and carry out operations to remove and/or attach carriages from/to a system of flexible members.

In advantageous embodiments, the system of flexible members comprises an active branch, along which the insertion station and the folding members are arranged, and a passive or return branch, which returns the carriages to the start of the active branch. The active branch can extend substantially horizontally. To obtain smaller footprints and sizes in vertical direction, the return branch can also be horizontal. In embodiments described herein the active branch is located below the return branch. The prongs of the various carriages extend toward the outside of the closed path defined by the system of flexible members. Along the active branch the prongs can extend downward.

Therefore, the active branch of the system of flexible members can be located along the feed path and directly above it.

Downstream of the folding members there a closing station can be provided, for example a welding station, where the wrapping sheet, suitably folded around the product or products forming a pack, is welded, for example by means of heating. In some embodiments, alternatively or in addition to heat welding systems, mechanisms for attaching adhesive sheets or labels to close the packs can be provided.

The folding members can be configured to fold the wrapping sheet under and laterally to the pack of products after the pack has been wrapped with said sheet at the top by means of interaction of the pack raised by an elevator in a wrapping sheet previously laid crosswise with respect to the insertion trajectory of the pack by means of said elevator in the feed path.

In some particularly advantageous embodiments, the magazine of carriages comprises an endless member with which the carriages intended to remain standing by in the magazine can be coupled and from which said carriages can be picked up each time, to be mounted on the system of flexible members of the conveyor device. Mutual coupling members can be provided to connect the carriages to the endless member of the magazine. The endless member can be single or multiple, for example it can be formed by a plurality of endless chains or belts to form an endless path.

The endless member of the magazine can extend approximately parallel to the system of flexible members of the conveyor device. If this latter has approximately horizontal active branch and return branch, the endless member of the magazine can also extend approximately horizontally.

To obtain limited dimensions and facilitate manipulation of the carriages from the magazine to the conveyor device and vice versa, in some embodiments the magazine is positioned above the conveyor device. Moreover, the feed path of the products can be arranged under the system of flexible members of the conveyor device.

In some embodiments, the system of flexible members of the conveyor device can comprise a single pair of flexible members, activated by a single motor, and each carriage can be fastened to the two flexible members of said pair. In this way a very simple and compact machine is obtained.

In other embodiments, to obtain some operating advantages and flexibility, the system of flexible members can comprise a first pair of flexible members and a second pair of flexible members, which extend along the closed trajectory. In practice, the first pair and the second pair of flexible members can co-extend, i.e., extend along paths that are the same as each other. In advantageous embodiments, the two pairs of flexible members can be out of phase with respect to one another, i.e., the phase of one pair of flexible members can be modified with respect to the other. A first series of carriages can be constrained to the first pair of flexible members and a second series of carriages can be constrained to the second pair of flexible members. The carriages of one of said first and second series can be intercalated with the carriages of the other of said first and second series of carriages.

In this way in practice the carriages of the first series and the carriages of the second series are arranged alternated with each other along the closed trajectory. Each compartment for accommodating the products to be wrapped can thus be defined by a carriage of the first series and by a carriage of the second series. By modifying the phase of one pair of flexible members with respect to the other, the mutual distances of the two carriages of each pair and therefore, ultimately, the size (in the direction of feed) of each compartment for accommodating the products to be wrapped, can be modified.

In this way, it is possible to obtain, in a known way, high flexibility and rapid adjustment of the mutual position of the carriages.

The first pair of flexible members can be activated by a first motor and the second pair of flexible members can be activated by a second motor. The distance between carriages of each pair can be adjusted in this case by acting on the mutual phase between the two motors. These can for example be electric motors, to facilitate adjustment, but it would also be possible to use motors of another type, such as pneumatic or hydraulic motors.

To simplify the operations to attach the carriages to the system of flexible members and to remove the carriages from the flexible members and insert the carriages into the magazine, each carriage can comprise elements for reversible coupling to the flexible members. The same reversible coupling elements can be used to fasten the carriage to the magazine. This makes the structure of the carriages, as well as of the magazine, of the flexible members and of the manipulators, particularly simple. However, it would also be possible to use different reversible coupling elements to fasten the carriages to the flexible members of the conveyor device and to the magazine, respectively.

In some embodiments, a guide system of the carriages extends along the closed trajectory defined by the flexible members. The carriages can advantageously be provided with engagement elements to the guide system. For example the guide system can comprise a guide channel, or preferably two guide channels, positioned parallel to each other on the two sides of the conveyor device. Each carriage can be provided with one or more engagement members to the guide channel or channels. For example, each carriage can comprise two opposite wheels or rollers engaged in two guide channels. For improved engagement, each carriage can comprise two wheels or rollers on each side of the carriage. Each pair of wheels engages in one of the two opposite guide channels.

Each guide channel can have an opening for removing and inserting carriages, associated with the manipulators. In practice, each guide channel can be interrupted in a position in which the manipulators act, so as to allow the wheels or the rollers of the carriages to be inserted into the guide channel and to be removed from the guide channels. To obtain a smoother operation, during operation the openings can be closed by suitable closing members.

To improve operation of the machine, contrasting, or resting, surfaces, on which the flexible members can slide, can be arranged along at least a portion of the closed trajectory defined by the system of flexible members. The contrasting or resting surfaces can be positioned inside the closed trajectory defined by the flexible members.

The flexible members can comprise chains co-acting with toothed wheels, at least one of which is motorized. The chains can be provided with devices for securing the carriages. For example, the links of the chains can be structured so as to co-act with coupling elements provided on the carriages. In some embodiments, the chains can comprise pins or other suitable members, with which the carriages are fastened. For example, the chains can comprise hinge pins of the links, which also form coupling members of the carriages.

To obtain a machine that is simpler and less noisy, less costly and easier to maintain, in advantageous embodiments the flexible members comprise toothed belts guided around toothed wheels. Each toothed belt comprises a first series of internal teeth, co-acting with the toothed wheels. Unless otherwise specified, the term "internal teeth" means teeth facing the inside of the trajectory defined by the respective flexible member.

In particularly advantageous embodiments, each belt can comprise a second series of external teeth, co-acting with connection elements of the carriages. Unless otherwise specified, the term "external teeth" means teeth facing the outside of the trajectory defined by the respective flexible member. In practice, in this embodiment each belt defining a respective flexible member is a double sided belt.

The use of double sided belts enables a particularly simple and reliable mutual connection system between flexible members and carriages to be obtained.

In fact, each carriage can in this case comprise teeth complementary to the external teeth of the toothed belts forming the flexible members to which the carriage is constrained. The complementary teeth of the carriages are suitable to provide a shape coupling with the external teeth of the respective toothed belts. The mutual coupling between carriages and toothed belts is obtained in this way simply by meshing the teeth of the belt with the teeth of the carriage. Suitable reaction forces, for example generated between guide channels and wheels associated with each carriage, ensure that meshing between teeth of the carriage and teeth of the belts is maintained along the whole of the trajectory defined by the system of flexible members.

Advantageously, the same coupling system can also be used to constrain the carriages to the endless member of the magazine. In this case, this latter can be formed by one, or preferably two double sided toothed belts, i.e., comprising internal teeth and external teeth, the external teeth co-acting with the complementary teeth of the carriages to provide a mutual coupling between the endless member of the magazine and the carriages.

In some embodiments, the endless member of the magazine can comprise a number of belts, preferably double sided toothed belts, corresponding to the number of belts that form the system of flexible members of the conveyor device. If the conveyor device comprises two pairs of double sided toothed belts, the magazine can also comprise two pairs of double sided toothed belts. In other embodiments, as a system to modify the mutual distance between carriages is not necessary on the magazine, it is possible to use only one pair of belts, each of which can in this case have a width double the width of the belts of the conveyor device. In this way, it is possible to mesh complementary teeth of the carriages with the two belts of the magazine even when the complementary teeth have the same size in the direction of extension of the teeth as the width of the belts of the conveyor device and this latter has two pairs of belts, to which the two series of carriages are respectively constrained. Alternatively, the complementary teeth of the carriages of at least one of the two series can have a double length to mesh both with the belts forming the flexible members of the conveyor device, and with the belts of the magazine.

According to a further aspect, a method for setting up a wrapping machine as described above is provided, comprising the following steps:

determining a number of carriages and a mutual distance between carriages to be attached to the system of flexible members, as a function of at least one feature of packs of products to be formed with said wrapping machine;

transferring from the magazine to the system of flexible members or vice versa one or more carriages and fastening said carriages to the flexible members or to the magazine.

The method can also comprise one or more of the following steps:

picking up by means of the manipulators a plurality of carriages from the system of flexible members and transferring them to the magazine;

modifying by means of the manipulators the position of carriages arranged on the flexible members;

picking up by means of the manipulators a plurality of carriages from the magazine and transferring them to the system of flexible members.

In some embodiments, the method can comprise one or more of the following steps:

picking up by means of the manipulators the carriages from the system of flexible members and transferring them to the magazine, leaving at least one carriage constrained to the flexible members;

picking up by means of the manipulators a plurality of carriages from the magazine and transferring them to the system of flexible members arranging them according to predetermined pitches as a function of said at least one feature of the packs of products to be formed.

Further advantageous embodiments and features of the method and of the machine of the present disclosure are described hereunder with reference to the accompanying figures and in the appended claims, which form an integral part of the present description.

BRIEF DESCRIPTION OF THE DRAWINGS

The invention will be better understood by following the description and accompanying drawings, which show a non-limiting exemplary embodiment of the invention. More in particular, in the drawing:

FIG. 1 shows a schematic side view of a machine according to the invention;

FIG. 1A shows a kinematic diagram of the transmission of the conveyor device of the machine of FIG. 1;

FIG. 2 shows a plan view according to II-II of FIG. 1;

FIG. 7 shows an enlargement of the coupling members between a carriage and a toothed belt;

FIGS. 8A, 8B, 8C, 8D show a sequence of removing carriages from the magazine and attaching them to the conveyor device;

FIG. 9 shows a modified embodiment of the members for constraining the carriages to the flexible members of the conveyor device or of the magazine;

FIGS. 10A-10I show an operating sequence for transferring carriages from the magazine to the conveyor device in a further embodiment of the wrapping machine;

DETAILED DESCRIPTION OF EMBODIMENTS

Figure 3:
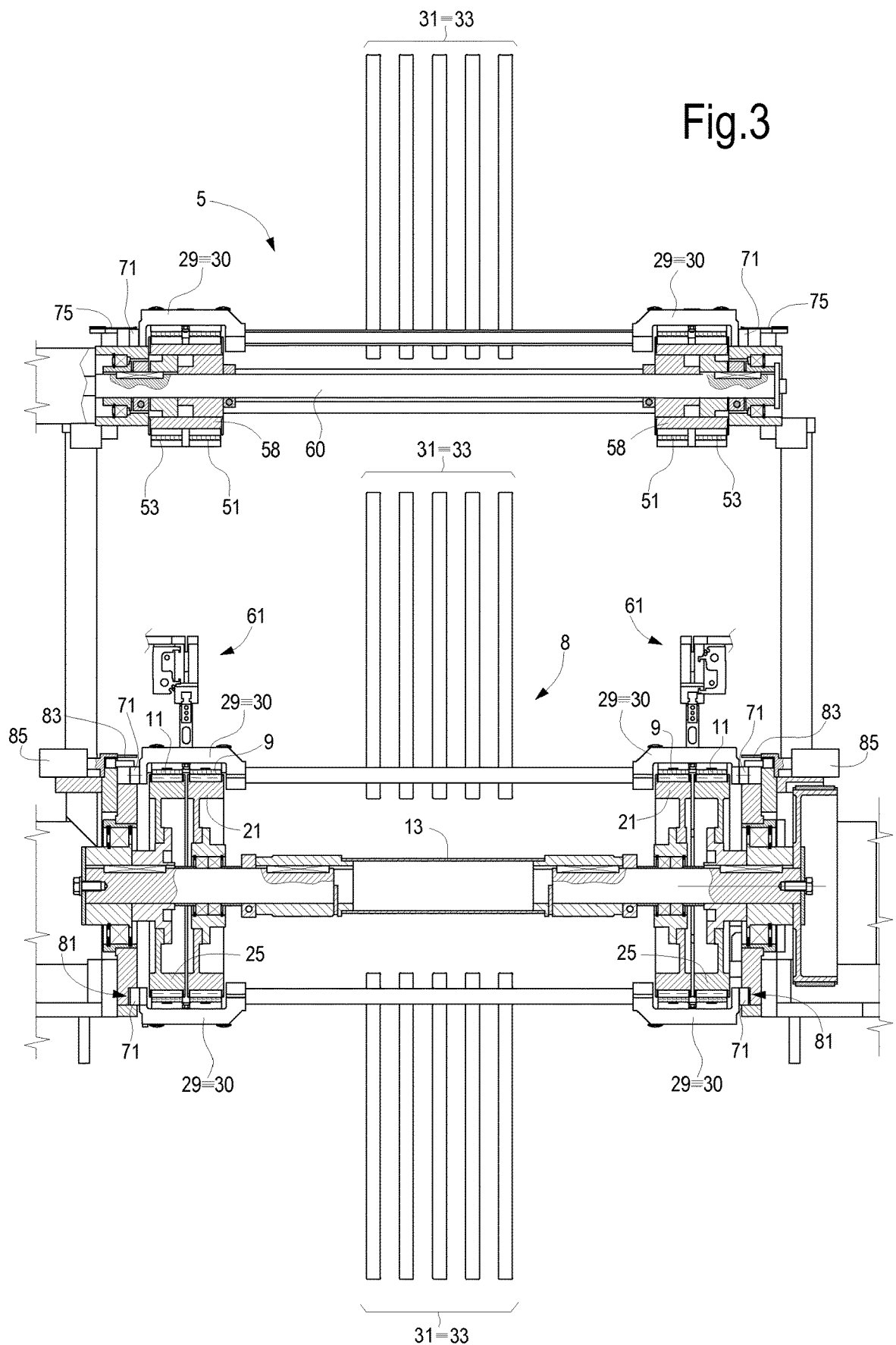
FIG. 3 shows a section according to III-III of FIG. 1.

The following detailed description of embodiments given by way of example refers to the accompanying drawings. The same reference numbers in different drawings identify identical or similar elements. Moreover, the drawings are not necessarily to scale. The following detailed description does not limit the invention. Rather, the scope of the invention is defined by the accompanying claims.

Reference in the description to "an embodiment" or "the embodiment" or "some embodiments" means that a particular feature, structure or element described in relation to an embodiment is included in at least one embodiment of the object described. Therefore, the phrase "in an embodiment" or "in the embodiment" or "in some embodiments" used in the description does not necessarily refer to the same embodiment or embodiments. Furthermore, the particular features, structures or elements may be combined in any appropriate manner in one or more embodiments.

In FIG. 1, the reference numeral 1 indicates as a whole a wrapping machine according to the present description. The wrapping machine 1 comprises a wrapping section 3 and a magazine 5. In the embodiment illustrated the magazine 5, which stores components that can be used in variable number in the wrapping section 3, is in a position higher than the wrapping section 3 and at least partially superimposed thereon. This allows the overall footprint of the wrapping machine to be reduced and the various members of which it is composed to be simplified. However, it would also be possible to arrange the magazine 5 in a different position with respect to the wrapping section, for example at the side of it and at the same height.

The wrapping section comprises a load-bearing structure 7 extending horizontally and carrying a conveyor device 8. In some embodiments, the conveyor device 8 can comprise a pair of flexible members. In the embodiment illustrated, the conveyor device 8 comprises two pairs of flexible members, indicated with 9 and 11, respectively. Each flexible member 9, 11 can, for example, comprise a chain. Preferably, in the embodiment illustrated each flexible member 9, 11 comprises a belt. Preferably, each belt 9, 11 is toothed. Even more preferably, as will be described in greater detail below and for the purposes that will be apparent from the following description, each belt 9, 11 is a double sided belt, i.e. having teeth on both sides.

Belts 9, 11 are guided around toothed wheels supported by shafts 13 and 15, motorized by motors 17 and 19, respectively. FIG. 1A schematically illustrates the arrangement of the belts 9, 11, of the shafts 13, 15 and of the motors 17, 19, as well as of the toothed guide wheels of the belts for greater clarity. However, this arrangement is known in the art. In the diagram of FIG. 1A, two toothed wheels 21 are fitted on the shaft 13 and are rotated by the motor 17. The innermost belts 9 are guided thereon. On the opposite side, the belts 9 are guided around toothed wheels 23, mounted idle on the shaft 15. The belts 11 are instead guided around toothed wheels 25 supported idle on the shaft 13 and around toothed drive wheels 27, fitted on the shaft 15.

With this arrangement the two motors 17, 19 can move the belts 9, 11 simultaneously. Moreover, by modifying the phase between the two motors 17, 19 the phase between the pair of belts 9 and the pair of belts 11 can also be modified. The reference numeral 26 schematically indicates in FIG. 1A an electronic control unit by means of which the phase of the two motors and/or other parameters of the wrapping machine 1 can be modified.

Carriages 29, 30, each of which is provided with one or more fingers or prongs 31, 33, are fastened on the belts 9, 11. The prongs 31, 33 are mounted on the carriages 29, 30 so as to be oriented toward the outside of the closed path defined by the belts 9, 11, and in particular approximately orthogonally to the trajectory of the belts 9, 11. Each pair of consecutive carriages 29, 30 with the respective prongs 31, 33 defines a compartment V for accommodating products to be wrapped. The carriages 29 are all fastened to the belts 9 and not connected to the belts 11, while all the carriages 30 are fastened to the belts 11 and not connected to the belts 9. In this way, the distance between carriages 29, 30 of each pair can be modified acting on the phase between the motors 17, 19.

The conveyor device 8 moves along a lower active path and an upper return path. An insertion station 35 of the products to be wrapped is arranged along the active path of the conveyor device 8. In the example illustrated, the products to be wrapped are rolls R of tissue paper, for example rolls of toilet paper or kitchen towel. In the set up illustrated in FIG. 1 each pack C comprises two layers of three rolls R each, but it must be understood that this is only one of the possible configurations of the packs that can be produced by the wrapping machine 1.

The insertion station 35 can comprise an elevator 37 provided with a reciprocating lifting and lowering movement according to double arrow f37, to pick up groups of rolls R from a feed line below (not shown) and transfer them to the level of a feed path P defined by the lower branch of the conveyor device 8.

In a manner known per se, a wrapping sheet F delivered by a reel B is arranged along the lifting trajectory of the elevator 37. The wrapping sheet F can, for example, be a plastic film. The lifting movement of the groups of rolls R causes the wrapping sheet F to wrap three sides of the pack C.

Folding members, arranged along the feed path P and indicated schematically with 38 and 39, wrap the wrapping sheet F around the lower face of each group of rolls R and on the two lateral faces. In the embodiment illustrated, the folding members 39 are stationary, but it would also be possible to use dynamic folding members, i.e., provided with a wrapping movement of their own, as known from current art machines. Examples of folding members are described in the prior art documents cited in the introductory part of the present description.

Movement of the packs C of rolls R being produced along the path P is obtained by the conveyor device 8 and is controlled by the motors 17, 19. Each pack C is held in a respective compartment V defined between two series of prongs 31, 33 of two corresponding carriages 29, 30.

The packs C are released by the conveyor device 8 at the exit of the feed path P, where a welding station, 41, known per se, is located. A conveyor, indicated generically with 43, picks up the packs C exiting from the wrapping machine 1 and feeds them through the welding station 41.

The size of the compartments V must be adjusted as a function of the shape and size of the packs C to produce. Small variations of size in the direction of the feed path P can be obtained by modifying the phase between the motors 17, 19 as described above. However, when the arrangement and the number of rolls R per pack C varies, it is necessary to modify the number of carriages 29, 30 and their position along the toothed belts 9, 11.

The magazine 5 of carriages 29, 30 is provided to facilitate these operations. The magazine 5 comprises (see FIGS. 1 and 2) a number of flexible members corresponding to the number of flexible members of the conveyor device 8. In the embodiment illustrated, the magazine 5 comprises four toothed belts 51, 53, arranged in the same mutual position as the toothed belts 9, 11 of the conveyor device 8. However, contrary to the toothed belts 9, 11 of the conveyor device 8, the toothed belts 51, 53 of the magazine 5 do not require to be phased with one another in a variable manner and can therefore be moved by a single motor 57 that controls the rotation of four coaxial toothed wheels 58 fitted on a common shaft 60. On the opposite side of the magazine 5 the toothed belts 51, 53 are guided around idle toothed wheels 59.

The carriages 29, 30 are provided with constraining members to the toothed belts 9, 11 and to the toothed belts 51, 53. Preferably, in the embodiment illustrated the same constraining members are used for connection both to the toothed belts 9, 11, and to the toothed belts 51, 53. However, in less advantageous embodiments, the carriages 29, 30 could also be provided with constraining members to the belts 9, 11 and with different constraining members to the toothed belts 51, 53. In this case, a single pair of toothed belts could also be provided on the magazine 5, instead of two pairs of toothed belts 51, 53.

In further embodiments, the magazine 5 may not have flexible members for moving the carriages 29, 30, but the movement of the carriages 29, 30 in the magazine 5 can take place with other movement members, for example with motorized slides that selectively engage each carriage and move it along tracks or rails, to which the carriages can be constrained.

The reference numeral 61 indicates manipulators that pick up carriages 29, 30 from the magazine 5 and transfer them to the conveyor device 8 and vice versa. The function and structure of the manipulators are shown in particular in the sequence of FIGS. 8A-8D, which will be described in greater detail below.

In some embodiments, the manipulators 61 comprise, for each side of the wrapping machine 1, a gripper 63 provided with a double movement according to the arrows fx and fy, i.e., along two orthogonal axes, respectively horizontal (parallel to the direction of the movement of the belts 9, 11) and vertical, to transfer the carriages from the height at which the conveyor device 8 is located to the height at which the magazine 5 above is located.

The vertical movement can be obtained by means of an endless belt or chain 69 that moves a slide 65 carrying the gripper 63 along a guide 67. The slide 65 can be telescopic, to move the respective gripper 63 in the direction fx.

To greatly simplify mutual coupling between carriages 29, 30 and the flexible members of the conveyor device 8 and of the magazine 5, the double sided belts described above are used as flexible members, and each carriage 29, 30 is provided with toothed profiles complementary to the external teeth of the toothed belts 9, 11, 51, 53.

FIG. 7 shows an enlargement of an example of a portion of any one of the toothed belts 9, 11, 51, 53 with which the wrapping machine 1 is provided. The belt comprises external teeth Text formed by a series of external teeth, and internal teeth Tint, formed by a series of internal teeth. The teeth Tint and Text are formed on the two main faces of the toothed belt. The teeth Tint are named internal as they face the inside of the closed path defined by the toothed belt, while the teeth Text are named external teeth, as they are provided on the face of the toothed belt facing the outside of the closed path defined by the toothed belt. In practice, the internal teeth Tint are those that mesh with the teeth of the toothed wheels, around which the respective belt is guided.

The external teeth Text instead co-act with toothed profiles 68 with which the carriages 29, 30 are provided. The toothed profiles 68 of the carriages 29 are positioned so as to couple with the toothed belts 11 and 53, while the toothed profiles 68 of the carriages 30 are positioned so as to couple with the toothed belts 9, 51, or vice versa. In this way, all the carriages 29 couple with the toothed belts 11 and all the carriages 30 couple with the toothed belts 9, or vice versa. The toothed profiles 68 constitute or form part of connection elements between the carriages 29, 30 and the belts 9, 11, 51, 53.

The described solution allows at least two important advantages. Firstly, the flexible members 9, 11, 51, 53 can be produced with material available on the market, as the toothed belts that can be used are generic double sided toothed belts manufactured as standard articles for multiple purposes. This makes production of the machine more economical and above all simplifies its maintenance. A broken belt can be replaced with another rapidly and at low cost.

Moreover, the mutual coupling and decoupling between carriages 29, 30 and belts 9, 11; 51, 53 is easy and rapid, and only requires movement of the two grippers 63.

In other, currently less preferred embodiments the toothed belts 9, 11, 51, 53 can only have internal teeth, while the outer surface can be substantially smooth. In this case, other systems can be provided for mutual constraint between carriages 29, 30 and belts. In some embodiments, for example, male and female or dovetail profiles can be provided to obtain mutual coupling, as indicated schematically in FIG. 9. In FIG. 9 the outer, substantially smooth surface of the belts 9, 11, 51, 53 is provided at suitable intervals with male dovetail profiles 10, with which female dovetail profiles 12, provided on the carriages 29, 30, couple. The arrangement can be inverted, with female profiles on the belt and male profiles on the carriages. Other mutual coupling profiles, such as an upside down T-shaped profile, can also be provided. Coupling and decoupling can in this case take place by means of a mutual movement between carriage and belt in a direction orthogonal to the longitudinal extension of the belt. The elements 10, 12 constitute or form part of connection elements between the carriages 29, 30 and the belts 9, 11, 51, 53.

In other, more complex and currently less preferred embodiments screw, bayonet or similar coupling members can be provided. In this case, an auxiliary mechanism may be necessary to activate and deactivate the mutual connection between carriages and belts.

Figure 4:
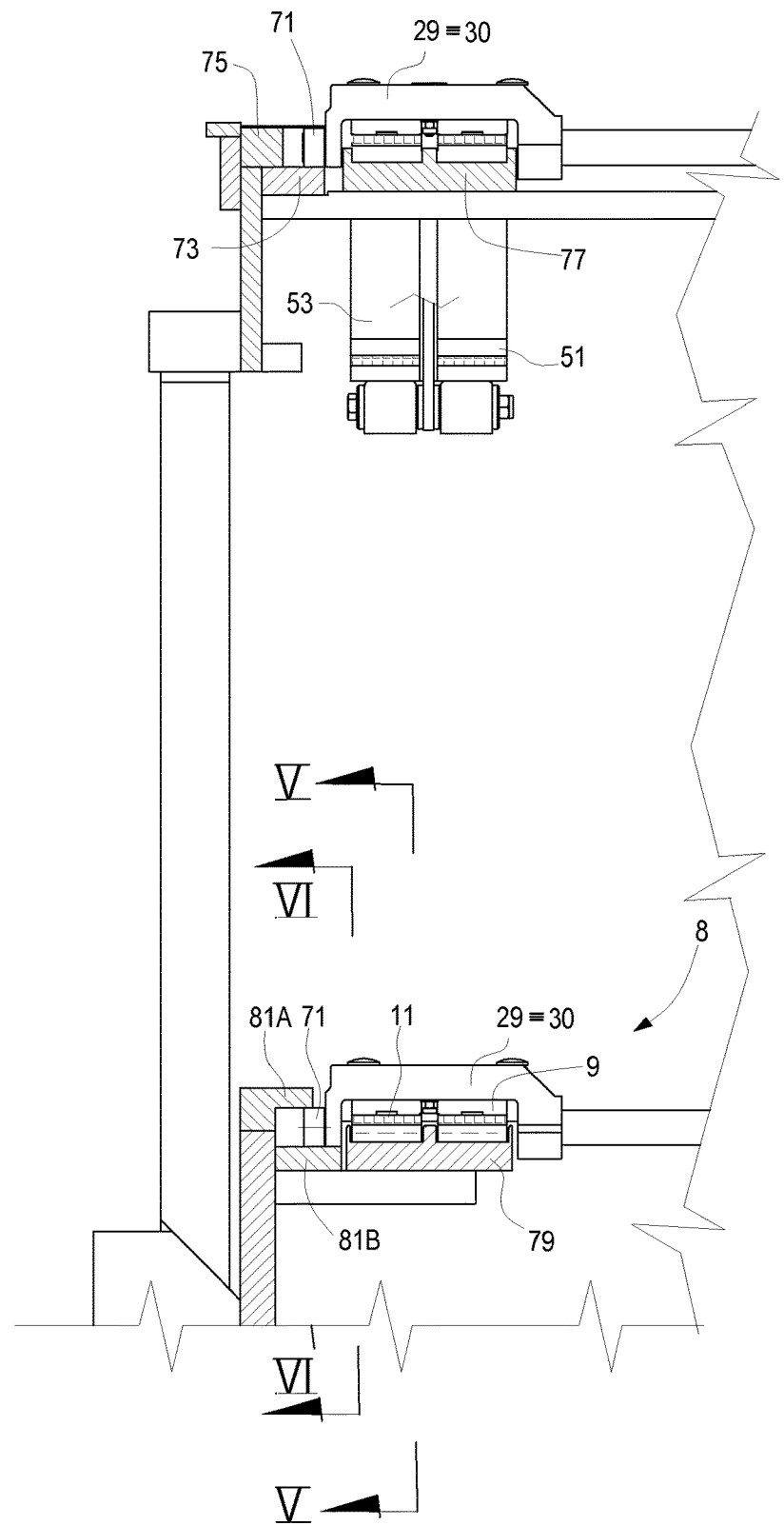
FIG. 4 shows a section according to IV-IV of FIG. 1.
Figure 6:
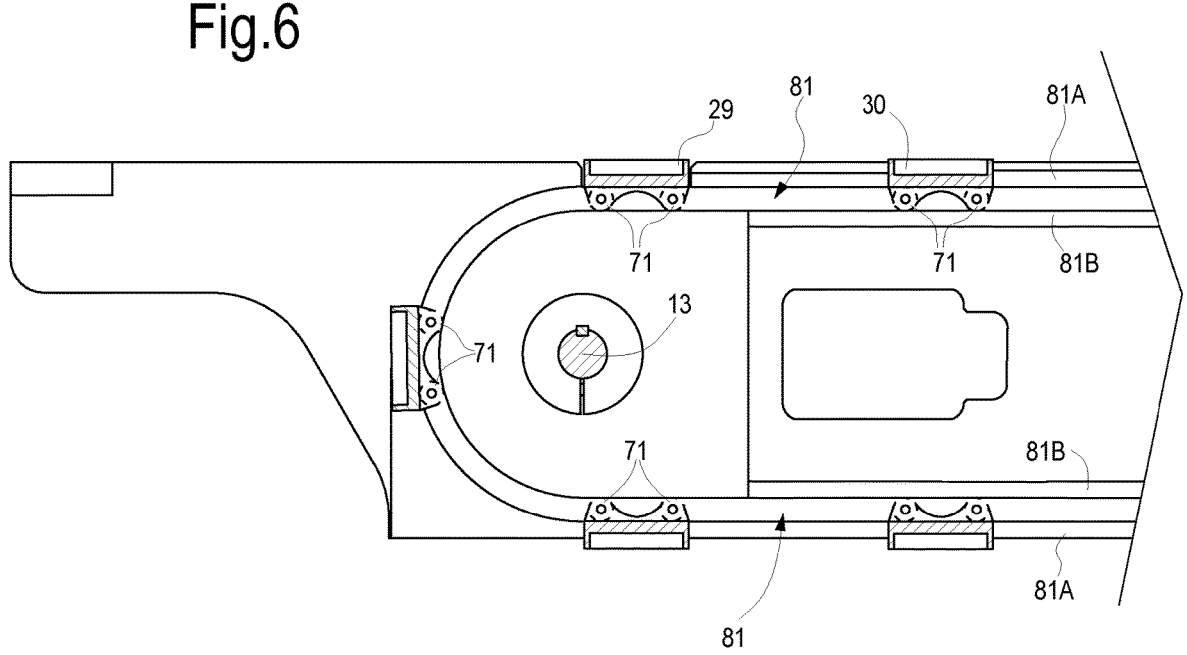

To obtain reliable coupling between carriages 29, 30 and teeth of the toothed belts 9, 11, 51, 53, in some embodiments the carriages 29, 30 can be provided, on both ends, with one or two wheels or rollers 71, see in particular FIGS. 4 and 6. The magazine 5 can comprise, on each side, a track 73, extending along the extension of the belts 51, 53. The wheels 71 of the carriages 29, 30 that are located in the magazine 5 can roll on the tracks 73. To prevent the wheels or rollers 71 from lifting off the tracks 73, opposing profiles 75 can be provided along said tracks 73, which together with the tracks 73 form a sort of C-shaped channel inside which the wheels or rollers 71 are inserted. The channels are open at the top in the area of insertion and removal of the carriages by the manipulators 61.

In some embodiments, to prevent a downward flexing of the upper branches of the belts 51, 53 from causing accidental detachment of the toothed profiles 68 from the external teeth of the belts 51, 53, along the upper branches thereof these latter can rest inferiorly on a support 77.

Figure 5:
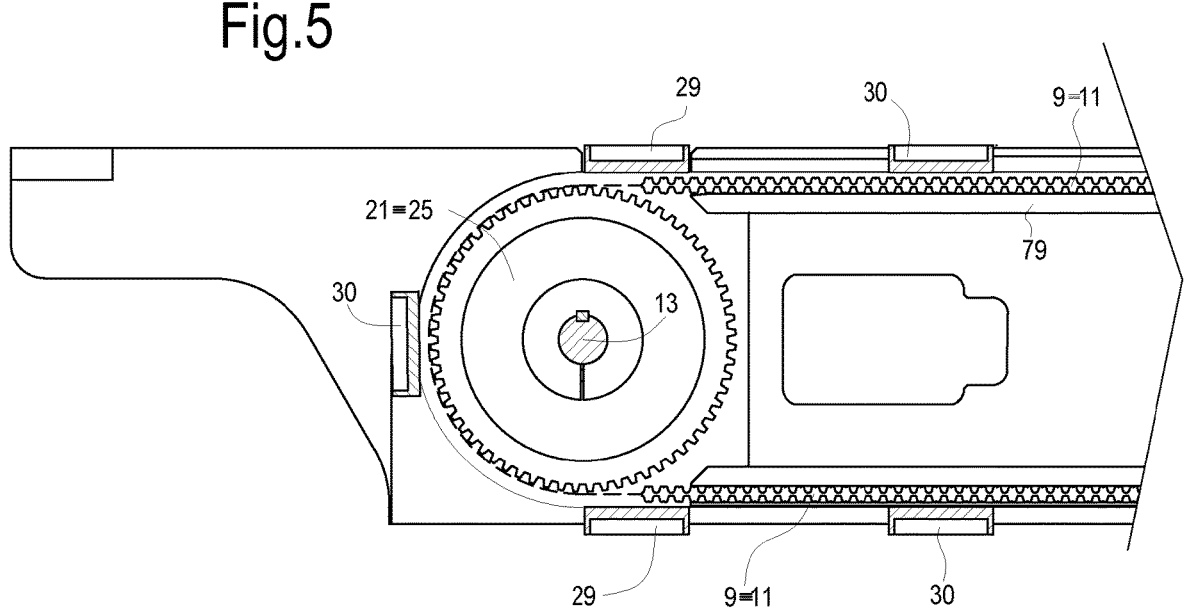
FIGS. 5 and 6 show sections according to V-V and VI-VI of FIG. 4.

A similar arrangement can be provided on the two sides of the conveyor device 8, along the closed paths defined by the belts 9, 11. For example, the inner surface (i.e. the one facing the inside of the closed path) of each belt 9, 11 can rest on a rest or support 79 (FIG. 5) defining a contrasting surface, that prevents the belt from flexing toward the inside of the closed path. Moreover, two C-shaped guides indicated with 81 (see in particular FIGS. 4 and 6) can be provided on the two sides of the path of the belts 9, 11. Each C-shaped guide can be formed of two parallel rectilinear elements 81A; 81B. To allow insertion and removal of carriages 29, 30, the C-shaped guides 81 can be interrupted in the area in which the manipulators 61 are located. Here the C-shaped guides 81 can be opened and closed by means of respective doors 83, activated by actuators 85, for example piston-cylinder actuators, see in particular FIG. 3)

Figure 8A:
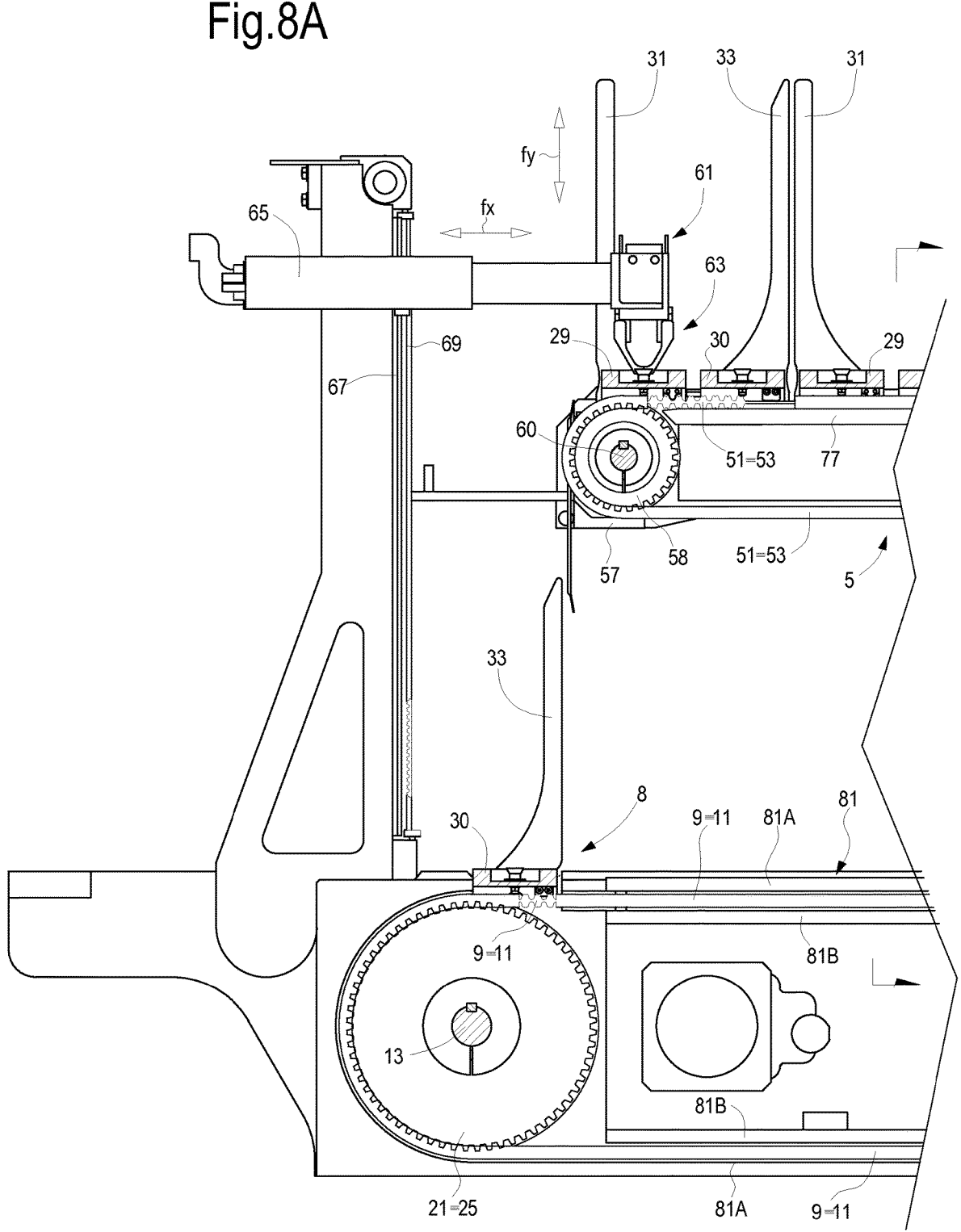
Figure 8C:
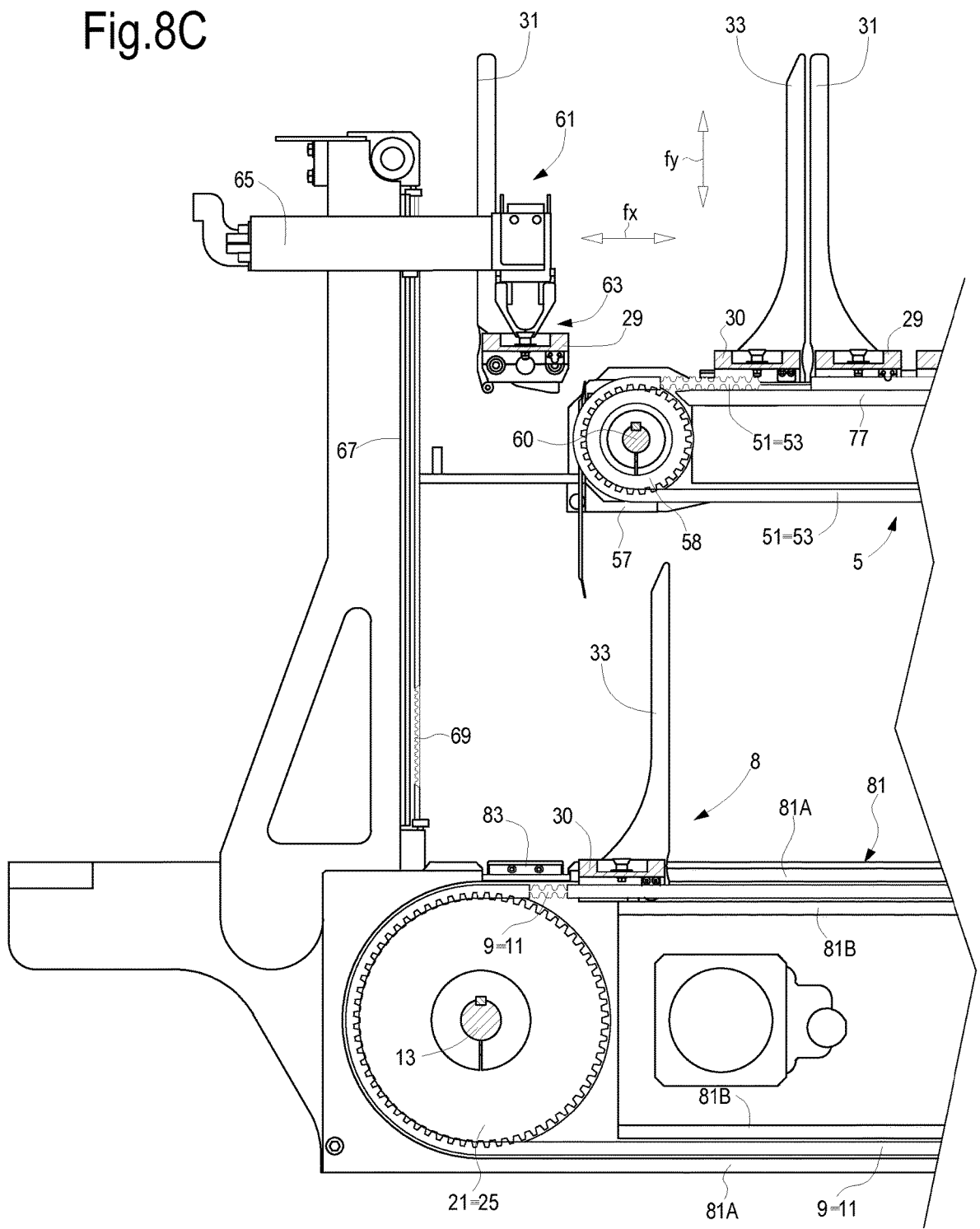
Figure 8D:
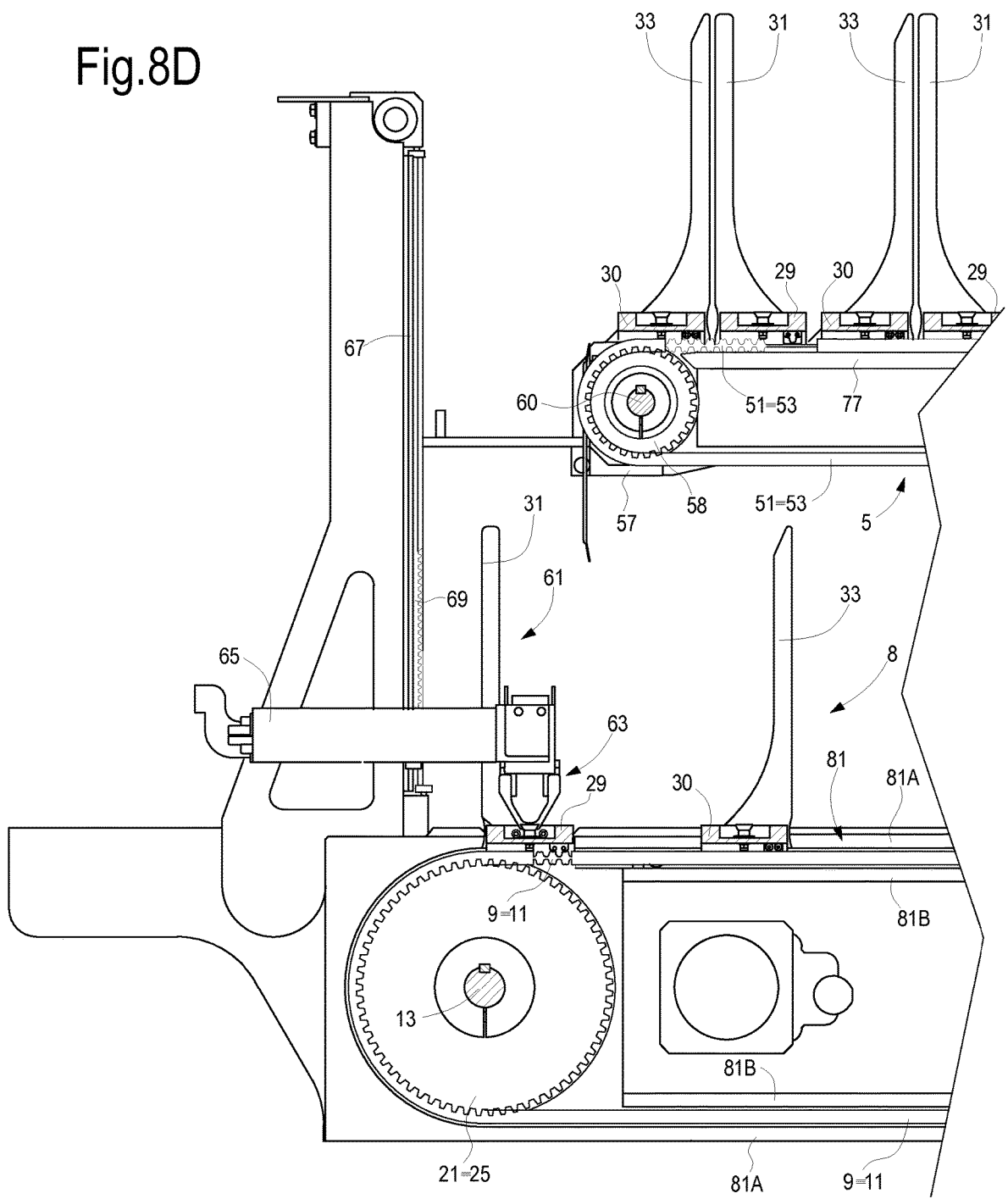

FIGS. 8A-8D show an operating sequence for insertion of carriages 29, 30 from the magazine 5 to the conveyor device 8. In FIG. 8A the grippers 63 of the manipulators 61 are arranged above the ends of a carriage (in the example a carriage 29) located at the end of the magazine 5. The carriages 29, 30 can be provided with pins or other members that can be engaged by the grippers 63. In FIG. 8A each gripper 63 has already engaged the respective pin of the carriage 29.

Subsequently (FIG. 8B) the grippers 63 of the manipulator 61 are lifted (arrow fy) and then translate horizontally (FIG. 8C, arrow fx) to move the carriage 29 out of the footprint of the magazine 5. In the subsequent step (FIG. 8D) the grippers 63 are lowered and arrange the carriage 29 on the belts 9, 11 of the conveyor device 8. The toothed profiles 68 of the carriage 29 engage with the toothed belts of the conveyor device. Coupling of the carriage 29 to the conveyor device 8 is made possible by the fact that the door 83 is temporarily opened.

The operations described above are repeated for all the carriages 29, 30 that must be transferred from the magazine 5 and mounted on the conveyor device 8. At each transfer operation of a carriage 29, 30 from the magazine 5 to the conveyor device 8, the belts 51, 53 advance to position the subsequent carriage in the operating area of the manipulator 61. Likewise, the conveyor device 8, and more precisely the belts 9, 11, advance by a pitch corresponding to the distance required between each carriage 29, 30 and the next. As observed previously, while the carriages 29 are constrained to the belts 9, the carriages 30 are constrained to the belts 11, or vice versa. By acting in a controlled manner on the two motors 17, 19 it is possible to set the required distance between carriages 29, 30 of each pair and consequently the size of each compartment V in the direction of the feed path P. Moreover, again by acting on the motors 17, 19, it is possible to set the required pitch between consecutive compartments V.

All the operations described above can be carried out automatically through the control of the electronic control unit 26. An operating panel can be provided, in which the operator can select the required format of the pack C so that the electronic control unit automatically calculates the number and the positions of the carriages on the belts 9, 11. Alternatively, a line supervision unit can be provided, which sets on all the machines, including the wrapping machine, the type of product to be produced through predetermined recipes.

When a work cycle ends and the wrapping machine 1 requires be set up for a different format, the operations described above can be carried out in reverse order, to remove the carriages 29, 30 from the conveyor device 8 and insert them in the magazine 5.

As a rule, at each change of format of the packs C, all the carriages 29, 30 can be removed from the conveyor device 8 and arranged in the magazine 5 and subsequently all the carriages 29, 30 required to produce the subsequent series of packs can be mounted, picking them up from the magazine 5 and mounting them on the conveyor device 8. Nonetheless, this may not always be necessary. For example, it may be sufficient to modify the mutual position of the carriages 29 and of the carriages 30 on the conveyor device 8, without increasing or decreasing their number. In this case, it may be sufficient to act on the motors 17, 19 and on the manipulators 61.

In other situations, it may be sufficient to transfer only a part of the carriages 29, 30 from the conveyor device 8 to the magazine 5, or vice versa. In this case, the sequence of FIGS. 8A-D or the opposite sequence is carried out for only a part of the carriages 29, 30.

Moreover, the provision of manipulators 61 allows the operations described above to be carried out in a completely automatic manner. However, it would also be possible to carry out the aforesaid operations with a manual control. For example, an operator can manually control feed of the motors and the manipulators by means of a suitable interface provided for the electronic control unit 26, for example a keypad, a mouse or the like.

The use of a magazine for the carriages associated with the conveyor device and with the manipulators to transfer the carriages from the magazine to the conveyor device and vice versa, allows wrapping machines to be produced with a series of further innovations.

In some embodiments, it is possible to configure the wrapping machine so that it can manipulate groups of rolls R even of very small sizes in the direction of feed of the conveyor device. For this purpose, the carriages 29, 30 can, for example, be mountable on the conveyor device in two different positions.

The sequence of FIGS. 10A-10I shows an operating sequence of a wrapping machine in an improved embodiment in which this is possible. The same numbers indicate the same or equivalent parts to those already described with reference to FIGS. 1 to 9. These parts will not be described again.

The main difference between the embodiment described previously and the one represented in the sequence of FIGS. 10A-10I consists in the different configuration of the manipulators 61. In fact, in the embodiment of FIGS. 10A-10I, the manipulators 61 are not only able to transfer carriages 29, 30 from the conveyor device 8 to the magazine 5 and vice versa with a simple translation motion, but are also adapted to rotate the carriages 29, 30 about a vertical median axis.

In some modes of operation the rolls R must be wrapped in single packs, or in packs that contain a single row of rolls R aligned according to their winding axis. In this case, there must be a very small mutual distance between carriages 29 and 30, substantially equal to the diameter of the rolls R. The shape of the carriages does not normally allow the carriages to move close enough to one another to sufficiently reduce the size of the compartments V in the direction of feed of the products to be wrapped.

To arrange the carriages 29 and 30 closer to one another, by means of the wrapping machine of FIGS. 10A-10I it is possible to rotate them as shown in the sequence so that the teeth 31 and 33 are closer to one another with respect to the normal conditions of use of the wrapping machine 1. In practice, starting from a condition of the type illustrated in FIG. 1, preferably having transferred all the carriages 29 and 30 onto the magazine 5, they will be re-transferred onto the conveyor device 8 rotating each carriage 29 in even position or each carriage 30 in odd position about a vertical median axis. To carry out this operation, as well as the horizontal and vertical translation movements already described, the manipulators 61 can have means that also allow a rotation movement of the single carriages 29, 30.

Figure 10A:
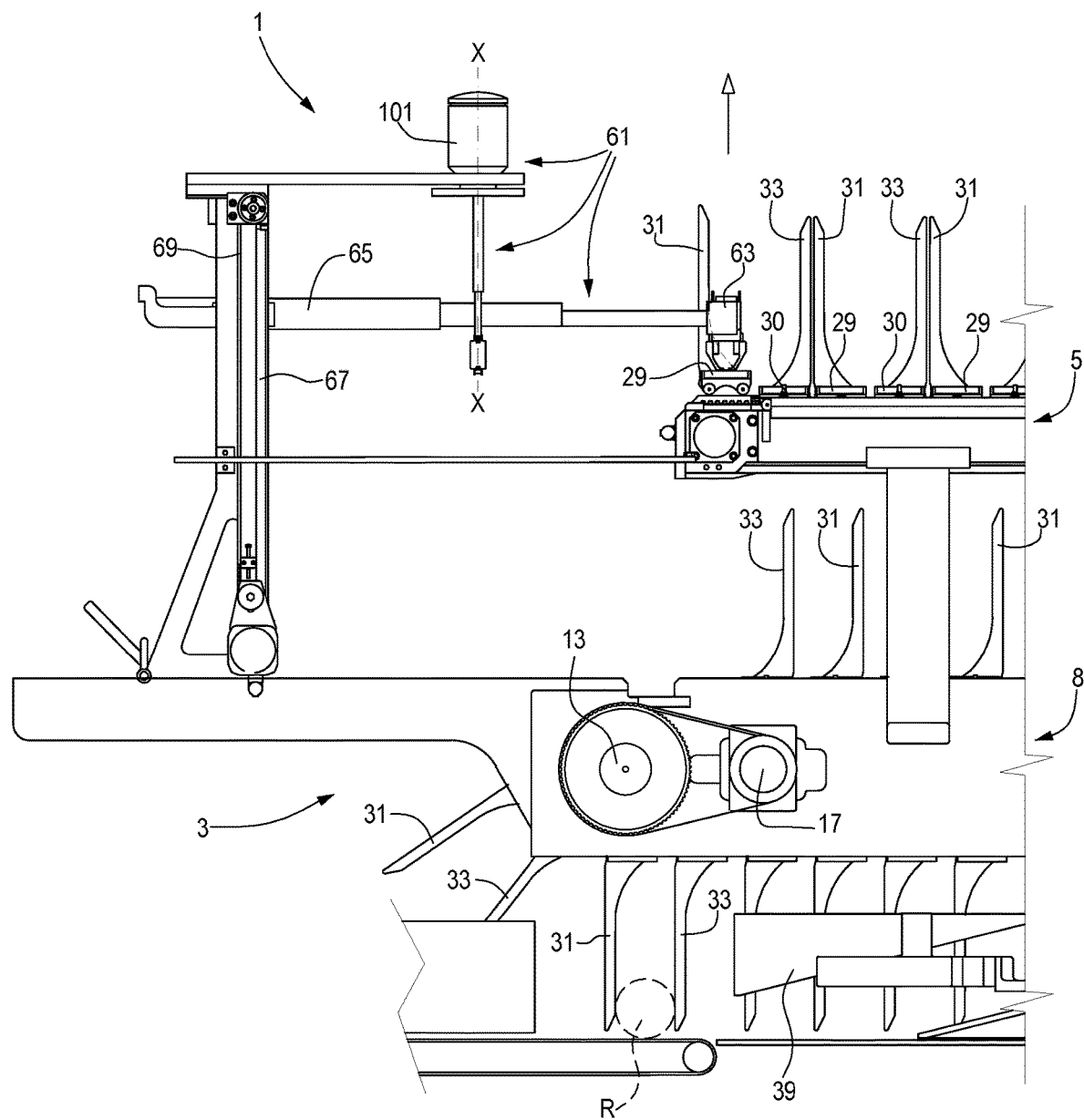
Figure 10B:
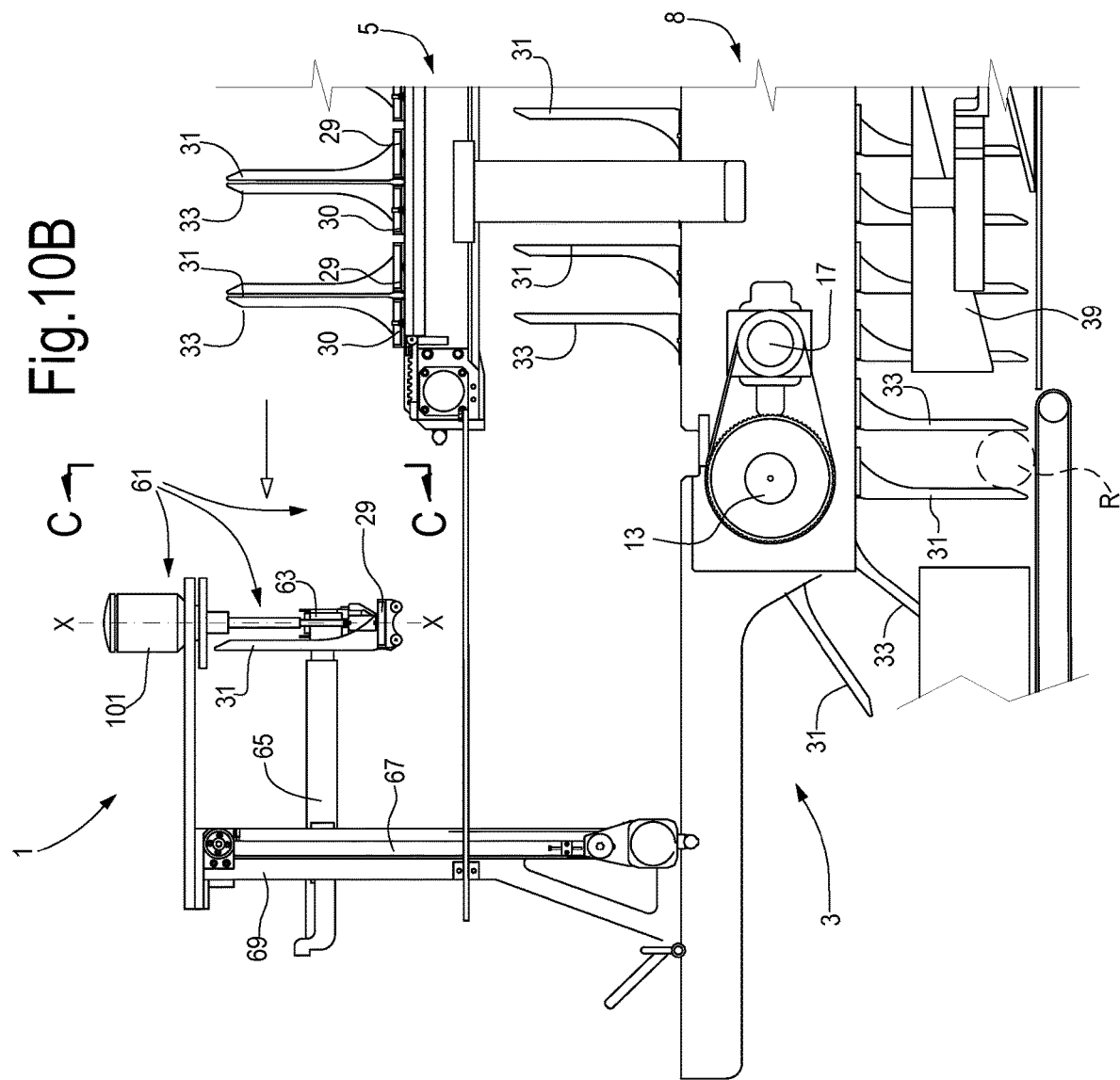
Figure 10C:
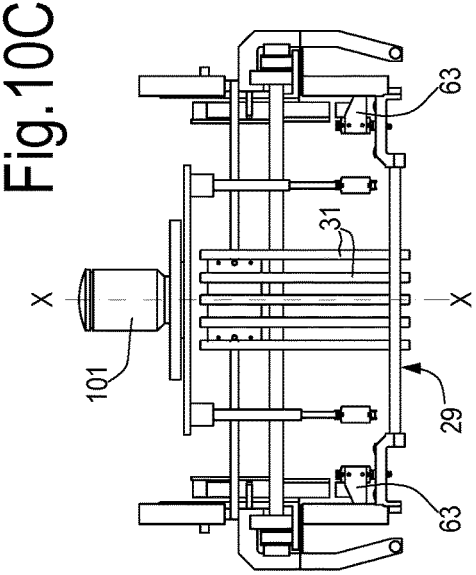
Figure 10H:
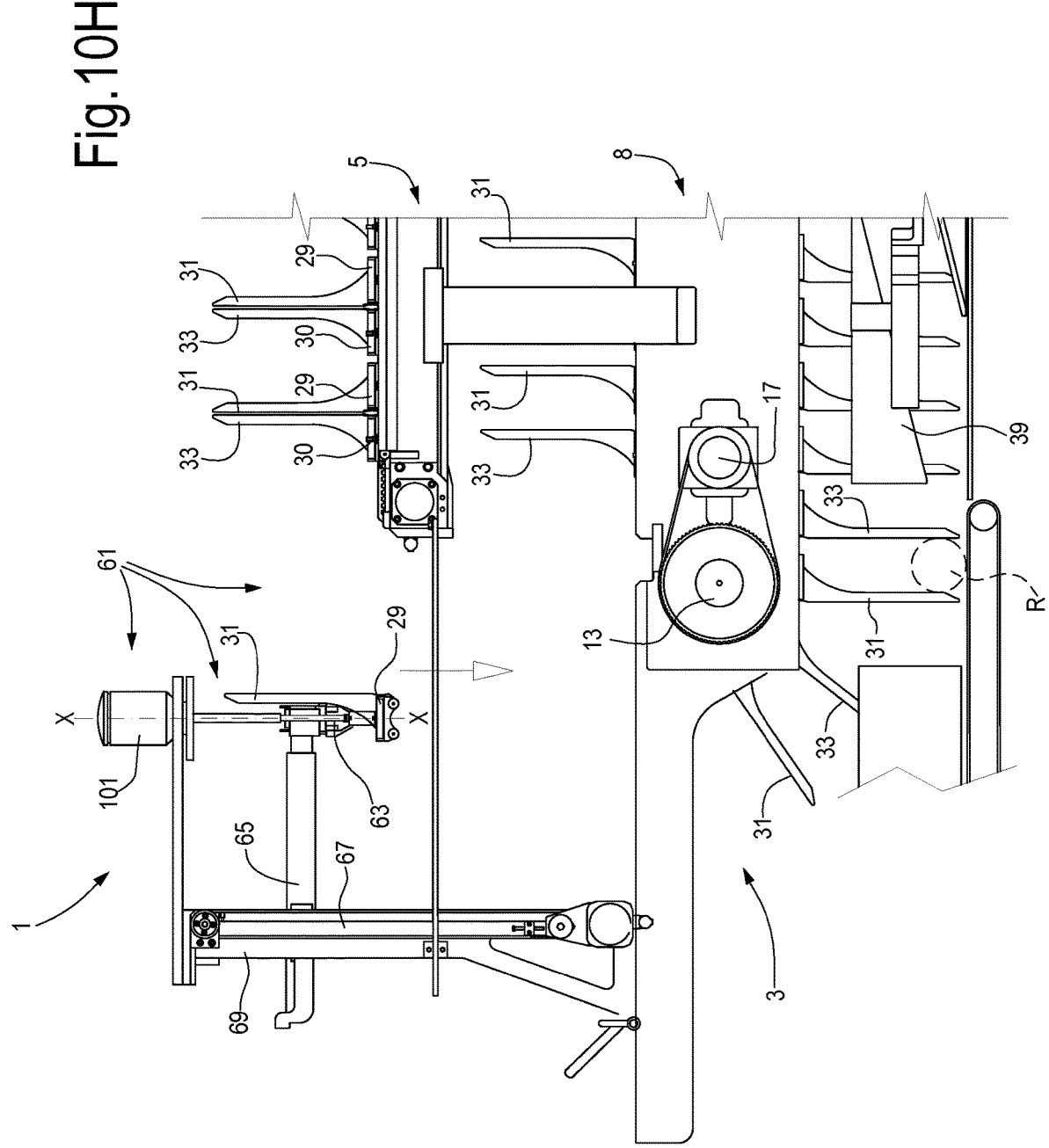
Figure 11A:
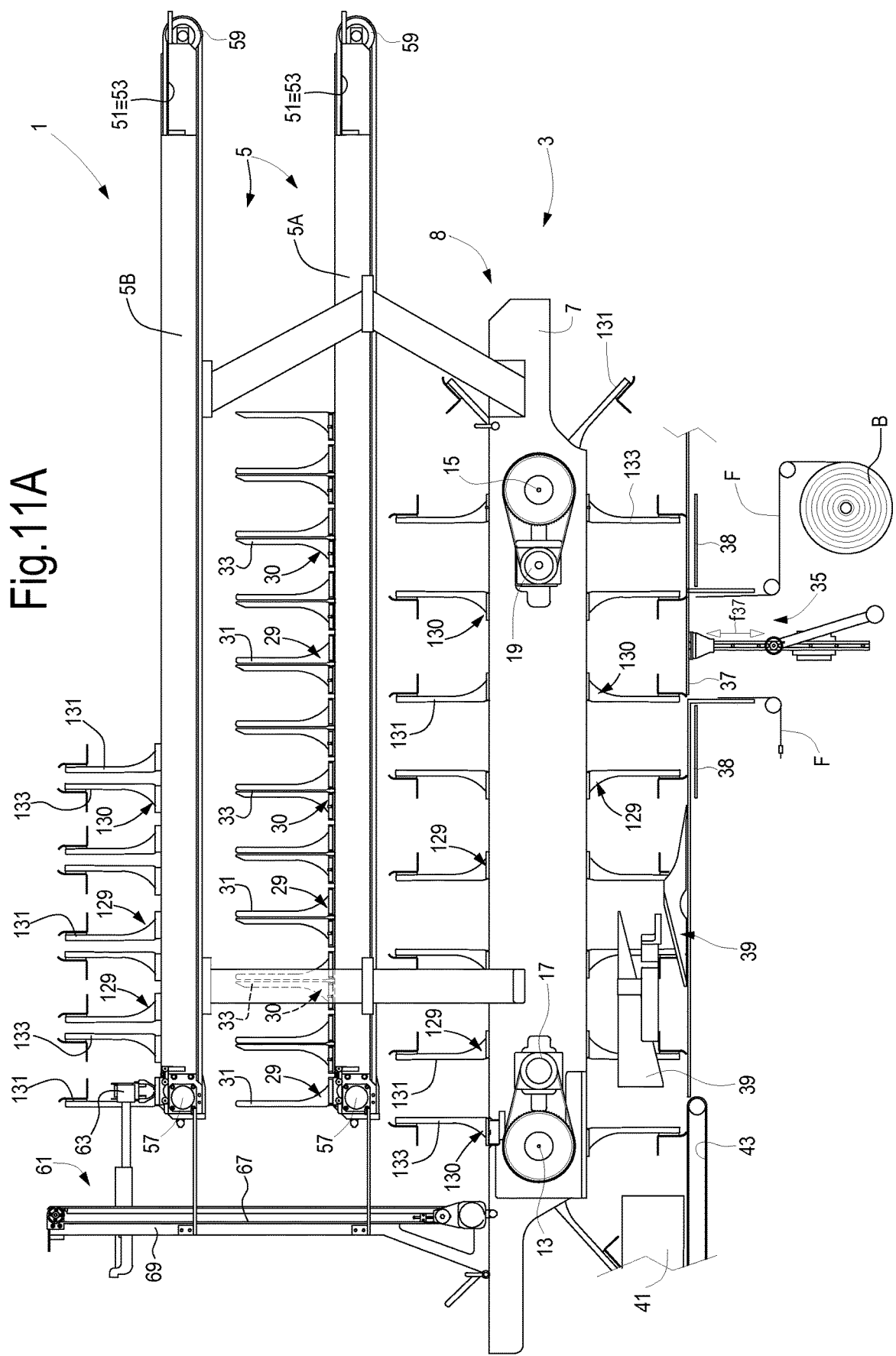
FIGS. 11A-11E show an operating sequence for transferring carriages from the magazine to the conveyor device in a further embodiment of the wrapping machine.
Figure 11B:
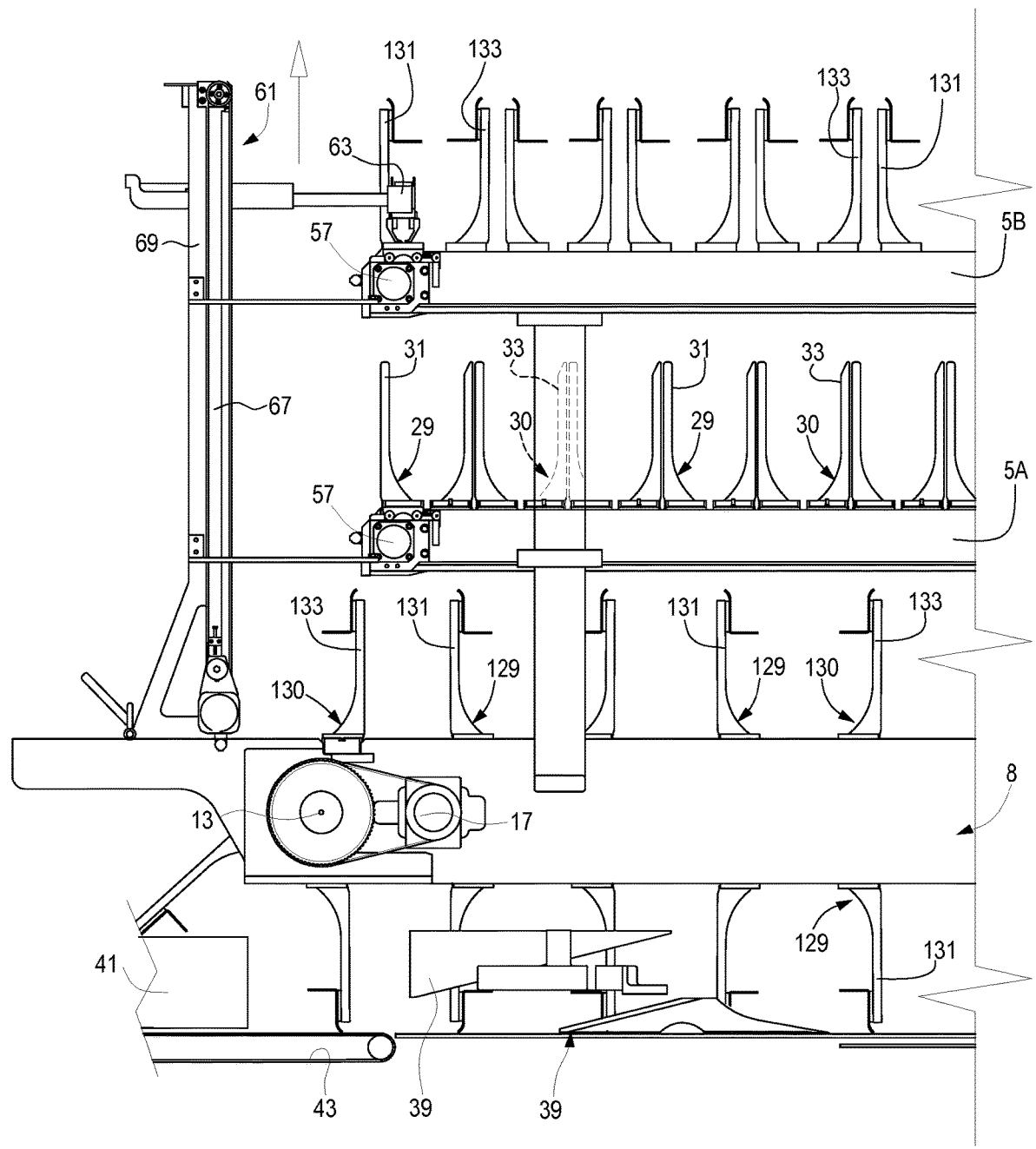
Figure 11C:
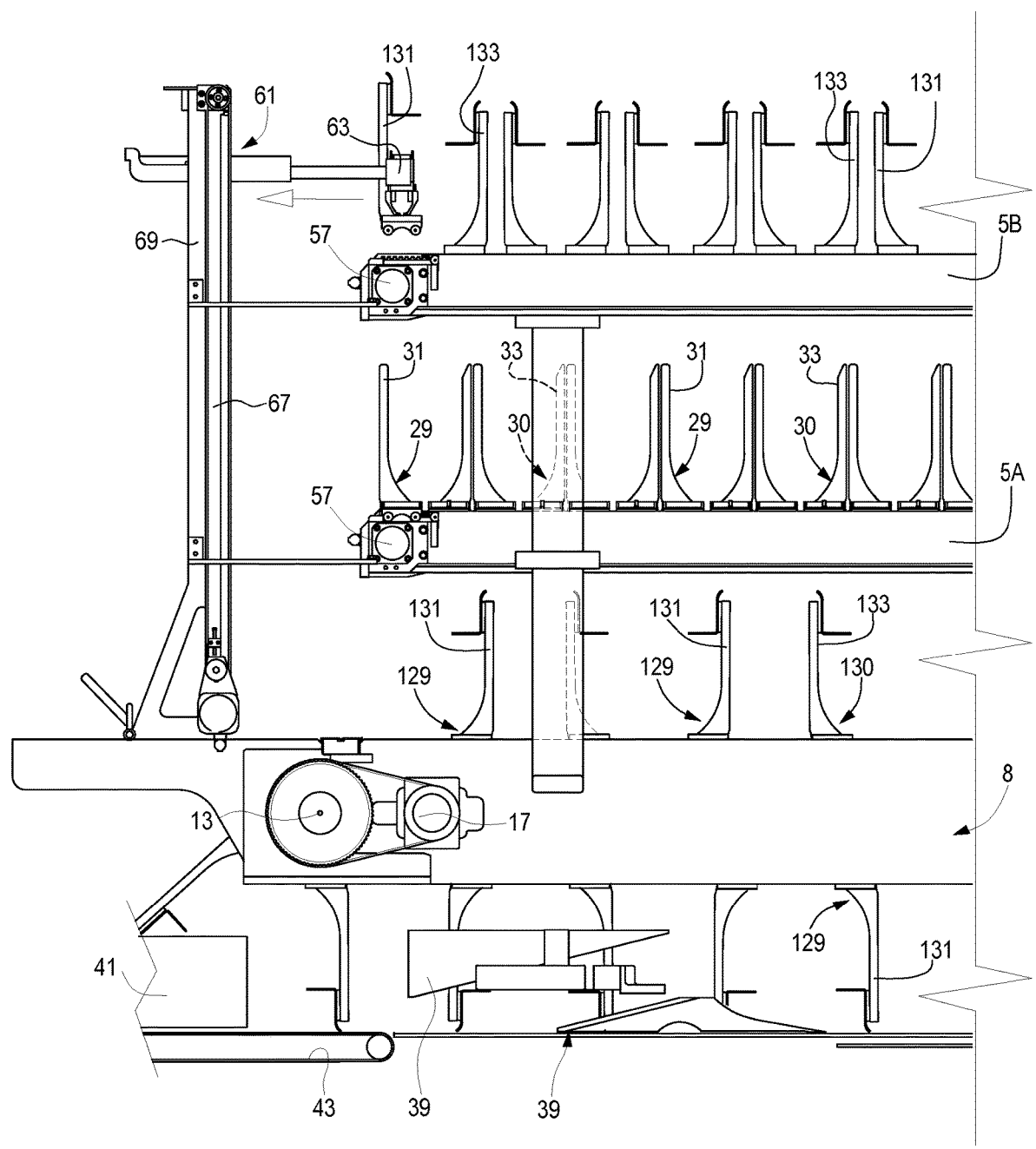
Figure 11D:
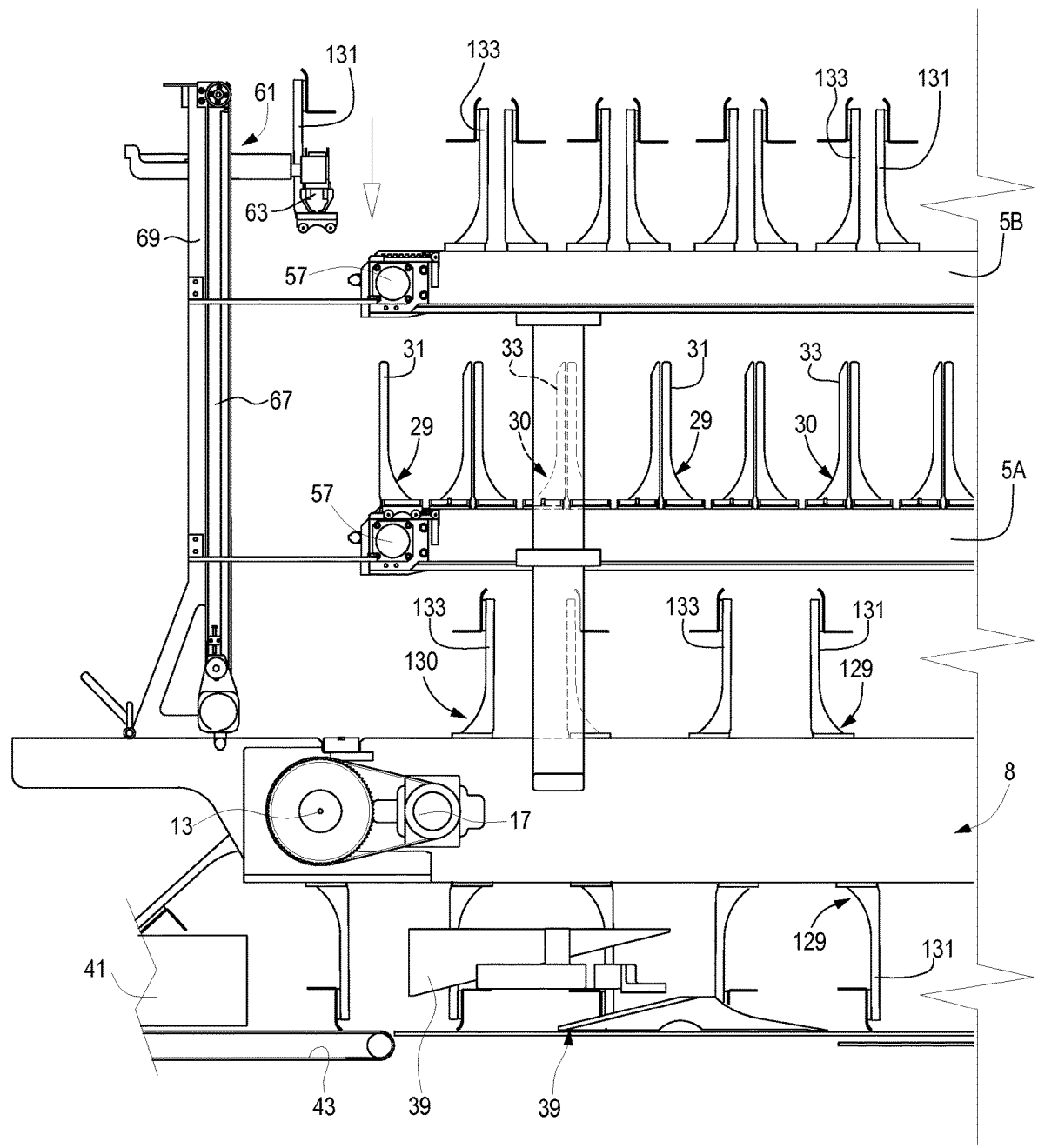
Figure 11E:
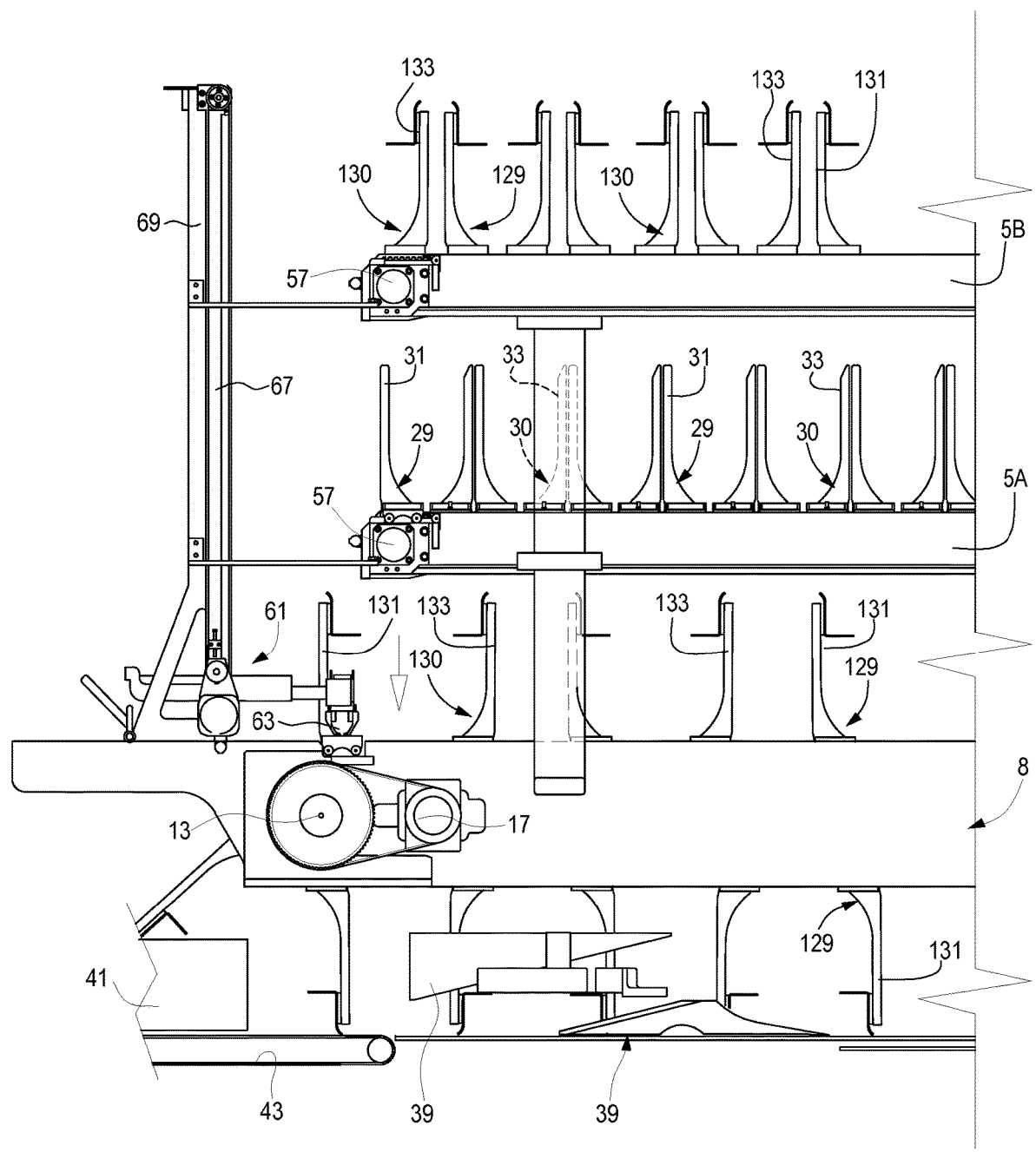

FIG. 10A shows a situation in which the manipulators 61 are engaging, by means of the grippers 63, a carriage 29 located on the magazine 5. To allow rotation of the carriage 29 about a vertical axis, the grippers 63 can be carried by slides 65 that can extend telescopically in horizontal direction and that can be combined with a rotation device indicated as a whole with 101. In the subsequent FIGS. 10B and 10C (where FIG. 10C is a view according to the line C-C of FIG. 10B) the grippers 63 have carried out a lifting and translation movement to carry the carriage 29 from the magazine 5 to a position under the rotation device 101.

FIGS. 10D, 10E (where FIG. 10E is a view according to the line E-E of FIG. 10D) show the subsequent step in which the carriage 29 has been engaged by the rotation device 101 and consequently released from the grippers 63. In FIGS. 10F, 10G (where FIG. 10G is a view according to the line G-G of FIG. 10F) the rotation device 101 is carrying out a rotation of the carriage 29 about a vertical axis X-X according to the arrow f101.

After carrying out a rotation through 180° about the axis X-X, the carriage 29 is re-engaged by the grippers 63, released from the rotation device 101 and translated downward (FIG. 10H, FIG. 10I) to the height at which the upper branch of the conveyor device 8 is located. From the position shown in FIG. 10I the carriage 29 is transferred by the grippers 63 of the manipulators 61 onto the conveyor device 8 according to the methods already described.

By carrying out this operation to rotate all the carriages 29 when they are transferred from the magazine 5 to the conveyor device 8, and vice versa transferring the carriages 30 without rotation, all the carriages 29, 30 on the conveyor device 8 will be oriented in the same direction and can therefore be arranged closer to one another to accommodate in the compartments V groups of rolls R each formed of a single roll R or of a single row of rolls R aligned according to their axis.

The operations to rotate the carriages carried out by the rotation device 101 can preferably take place during transfer of the carriages 29, 30 from the conveyor device 8 to the magazine 5 or vice versa. Nonetheless, this is not essential. One, some or all of the carriages that must be rotated can be picked up from the conveyor device 8 by means of the manipulators 61, rotated through 180° and mounted on the conveyor device 8 again, with the new orientation.

While in the previous embodiments the magazine 5 comprises a single section of magazine to house a series of carriages 29, 30 aligned with one another, for example constrained to the flexible members 51, 53, it would also be possible to provide more complex magazines 5, for example with several sections arranged side by side or preferably superimposed. Superimposing in vertical direction is preferable as it reduces the footprint of the wrapping machine 1.

For example, FIGS. 11A-11E show an embodiment in which the magazine 5 comprises a lower section 5A and an upper section 5B. The manipulators 61 are configured so as to reach both sections 5A, 5B of the magazine 5.

The arrangement of several sections side by side or superimposed firstly allows a greater number of carriages to be housed in the same magazine 5. Moreover, the presence of several sections in the magazine 5 also allows other advantages to be obtained, as better illustrated in FIGS. 11A-11E. For example, two series of carriages differing from one another, for example having a different shape of fingers or prongs, can be arranged in the two sections 5A, 5B of the magazine 5. More specifically, in the embodiment illustrated in FIGS. 11A-11E, the magazine section 5A comprises carriages 29, 30 with prongs 31, 33 of the type illustrated in FIGS. 1 to 9 and described previously. The magazine section 5B instead contains carriages 129, 130 provided with fingers or prongs 131, 132 of different shape, for example adapted to manipulate rolls R arranged with their axis in vertical rather than in horizontal direction.

In some embodiments, it would also be possible for two carriages of the same type, but with different orientations, to be arranged on the two sections 5A, 5B of the magazine 5.

For example, with the two sections of magazine superimposed it is possible to obtain the same function obtainable with the rotation device 101 described above with reference to the sequence of FIGS. 10A-10H. In this case the magazine with two sections avoids the need for a rotation device, but requires the presence of a greater total number of carriages 29, 30.

Returning to the sequence of FIGS. 11A-11E, the manipulators 61 can pick up carriages 29, 30 from the magazine section 5A and/or set them down therein with the same operating sequences as those described previously, or alternatively can pick up carriages 129, 130 from the magazine section 5B, or set them down from the conveyor device 8 in the magazine section 5B with the operating sequence illustrated in FIGS. 11A-11E.

While in FIGS. 11A-11E the magazine 5 is represented with two superimposed sections 5A, 45B, more than two superimposed and/or side by side sections could be provided, if this is useful or appropriate for the purpose of increasing the storage capacity and/or the number of different carriages that can be used on the same wrapping machine 1 and/or the different orientation of the carriages.

The embodiments illustrated in FIGS. 10A-10H and in FIGS. 11A-11E can be combined with one another, producing a wrapping machine 1 that has a magazine 5 with two or more mutually superimposed and/or side by side sections 5A, 5B, and also provided with manipulators 61 capable of carrying out translation and rotation movements of the carriages 29, 30, 129, 130.

The presence of a magazine 5 in combination with the conveyor device 8 and with the manipulators 61 makes it possible to configure wrapping machines 1 in which other problems of machines of the current are solved or alleviated.

In fact, as known in the art, the mutual position of the fingers or prongs 31, 33 arranged on a same carriage 29, 30 can require to be adjusted as a function of the size of the groups of rolls R to be wrapped. In particular, it may be necessary to move the fingers 31, 33 toward or away from each other in a direction orthogonal to the direction of feed of the rolls R through the wrapping machine 1.

For this purpose, wrapping machines that comprise devices for adjusting the mutual distance of the fingers or prongs of the various carriages are known. Examples of embodiments of adjusting devices and methods of this kind are described in US 2002/0059784, U.S. Pat. Nos. 8,430, 232, 7,789,219 and 8,727,106. The known adjustment devices are arranged along the path of the conveyor device. They have some drawbacks. Firstly, some of them require, for example, lengthy adjustment times. In general, to adjust all the carriages, the conveyor device must carry out at least one complete revolution. Moreover, the presence of these adjustment devices along the path of the conveyor device makes all maintenance operations difficult, in particular replacement of the chains or of the belts of the conveyor device in the case of breakage or wear.

The presence of a magazine associated with the conveyor device solves the problem of adjusting the mutual distance between the fingers or prongs of the single carriages, overcoming or reducing the drawbacks of state of the art devices. In fact, it is possible to position the adjustment devices associated with the magazine 5, rather than with the conveyor device 8. Moreover, as described below with reference to FIGS. 12 to 15C, adjustment devices that adjust the position of all the fingers or prongs of the carriages in very short times can be provided.

Figure 12:
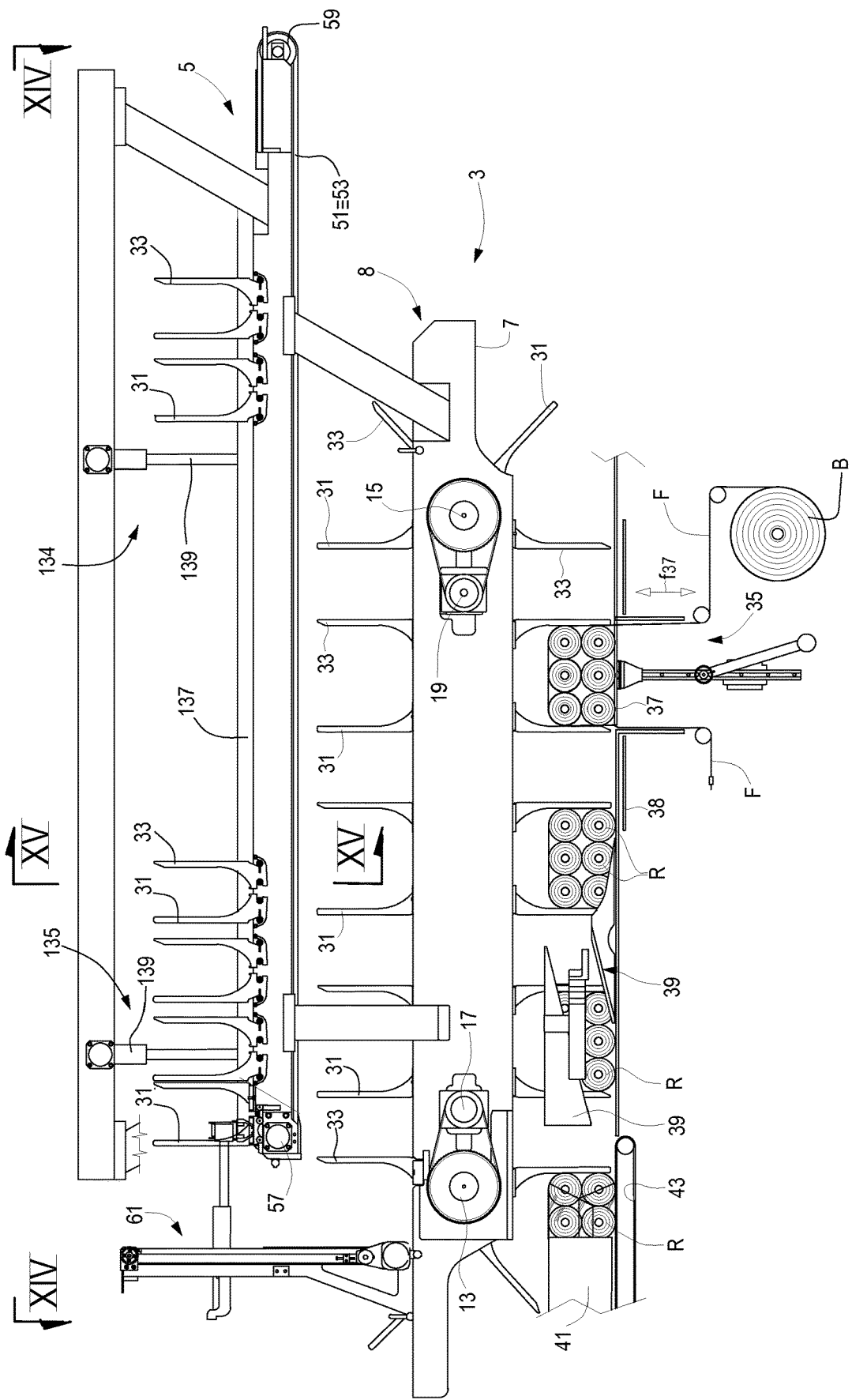
FIG. 12 shows a lateral view of a wrapping machine in a further embodiment with a system for adjusting the mutual distance between fingers or prongs of the carriages arranged in the magazine.
Figure 13A:
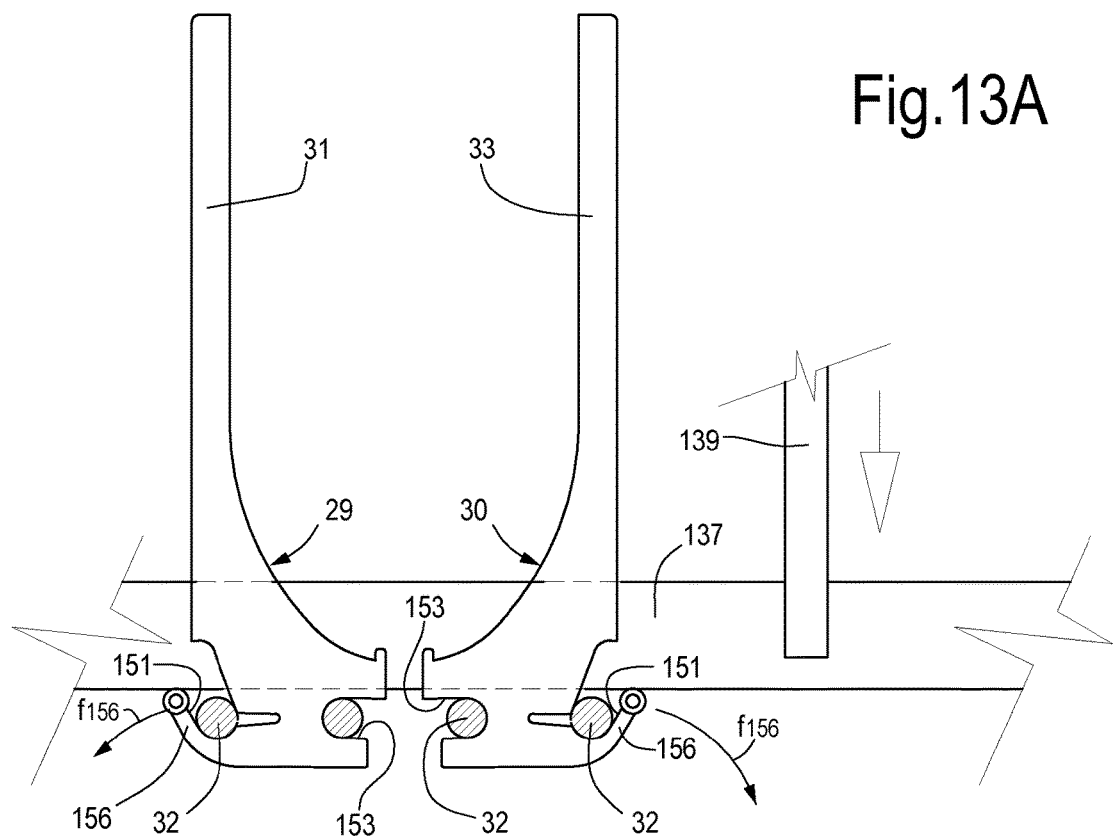
FIG. 13 shows an enlarged lateral view of two carriages and related fingers with means for blocking them in preparation for adjustment of the mutual distance thereof.
Figure 13B:
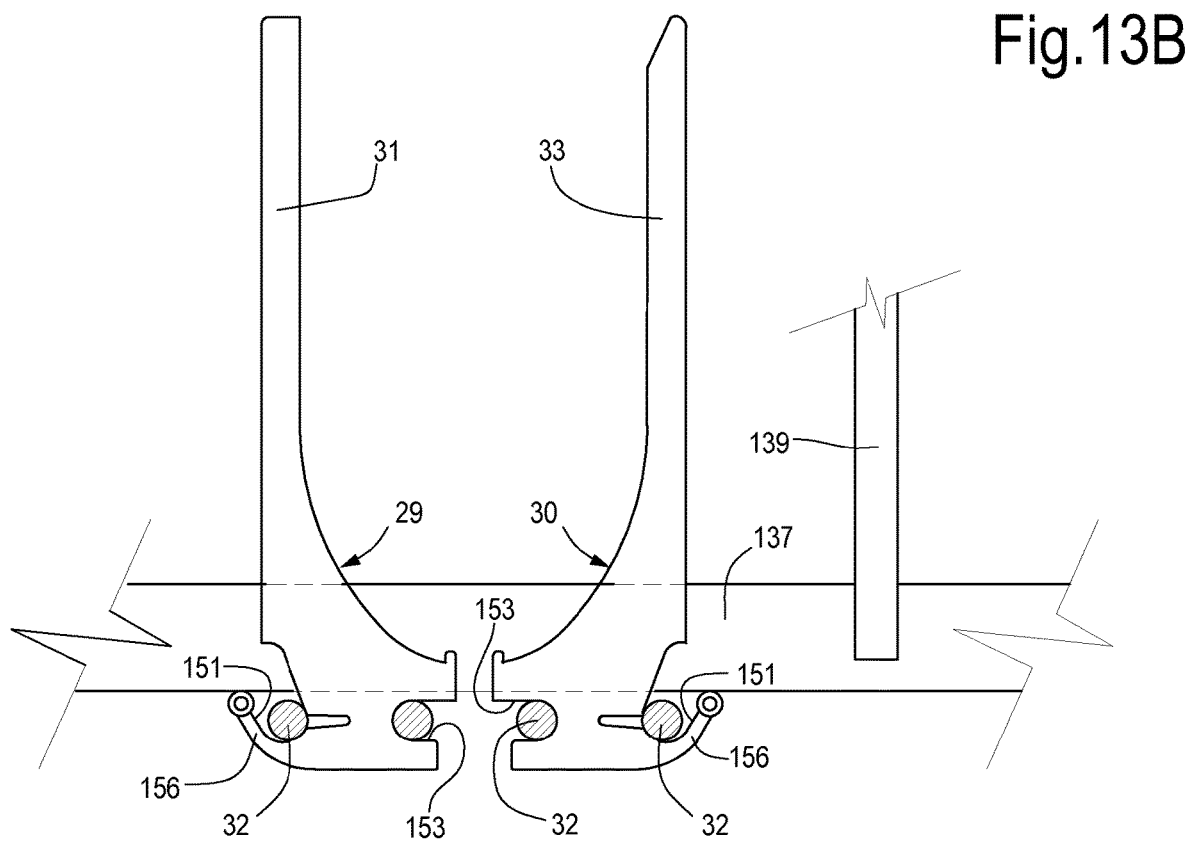
Figure 14:
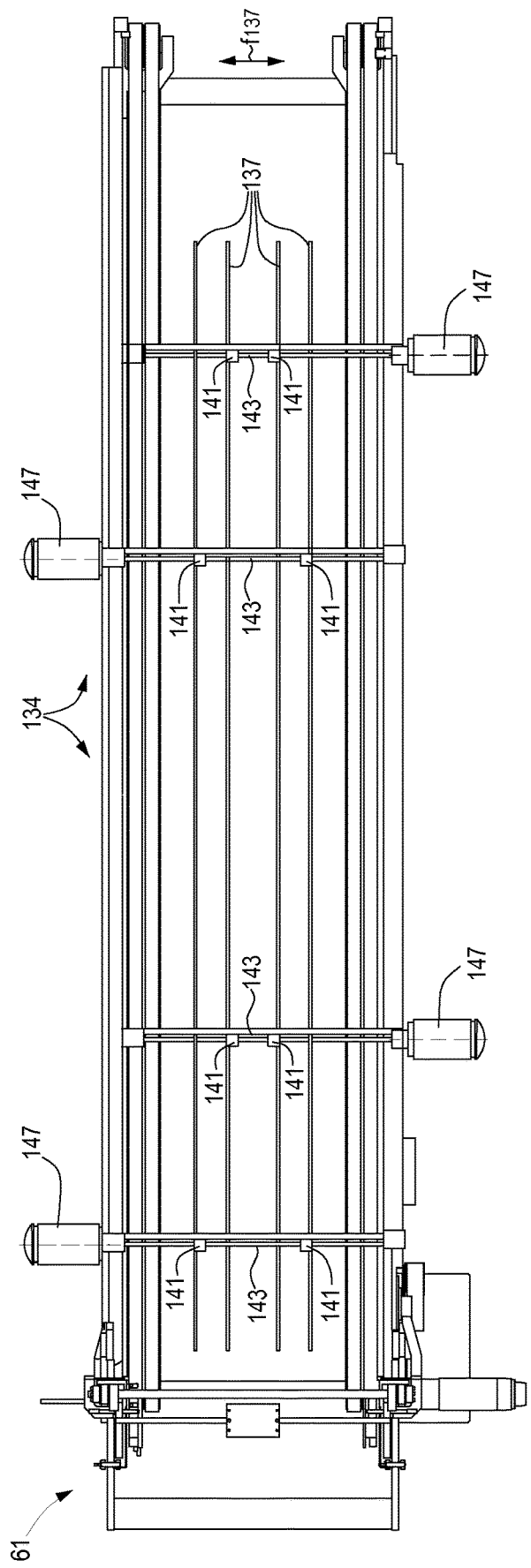
FIG. 14 shows a view according to XIV-XIV of FIG. 12.
Figure 15A:
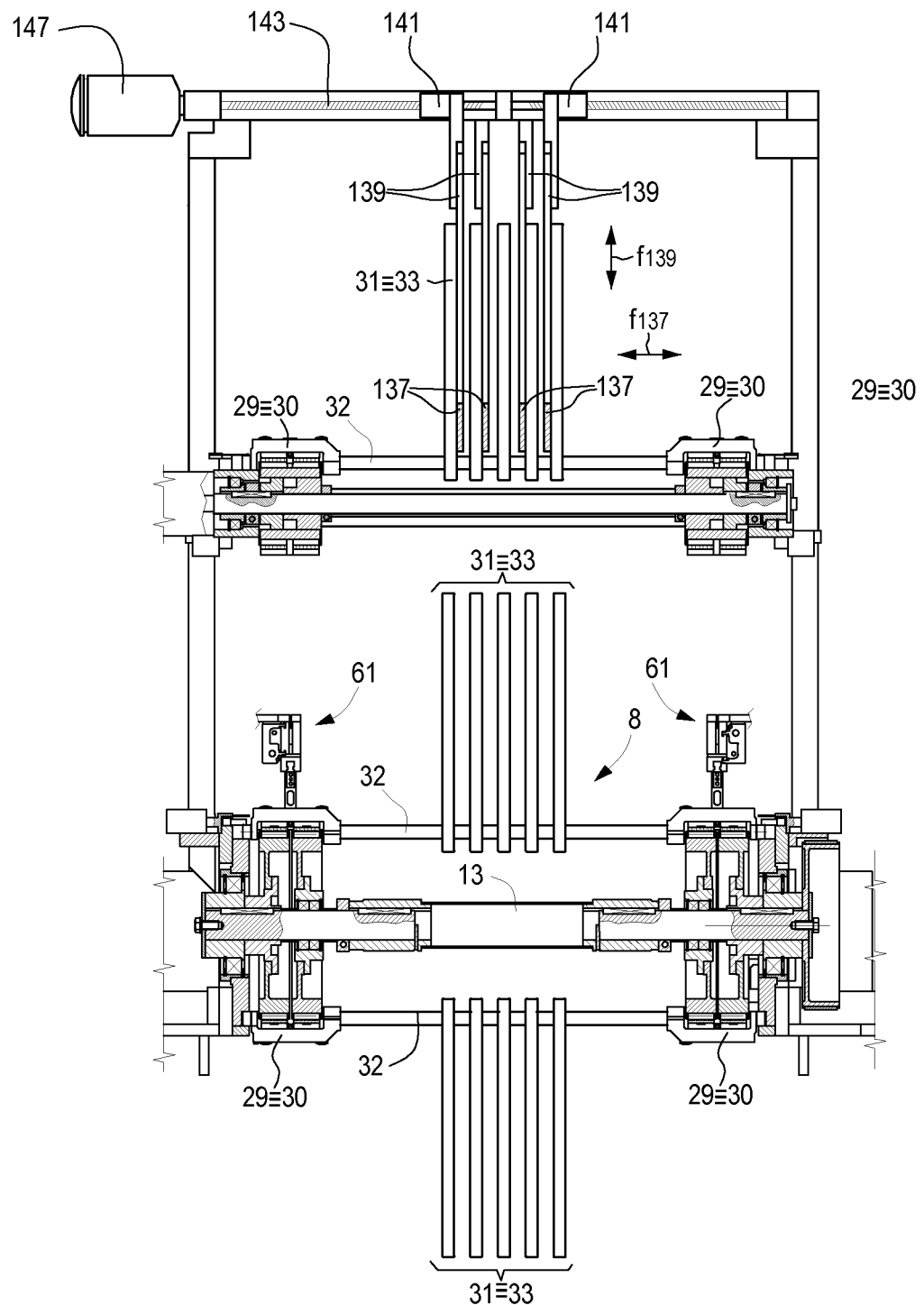
FIGS. 15A-15C show an operating sequence in a view according to XV-XV of FIG. 12, for adjusting the mutual distance of the fingers or prongs of the carriages.
Figure 15B:
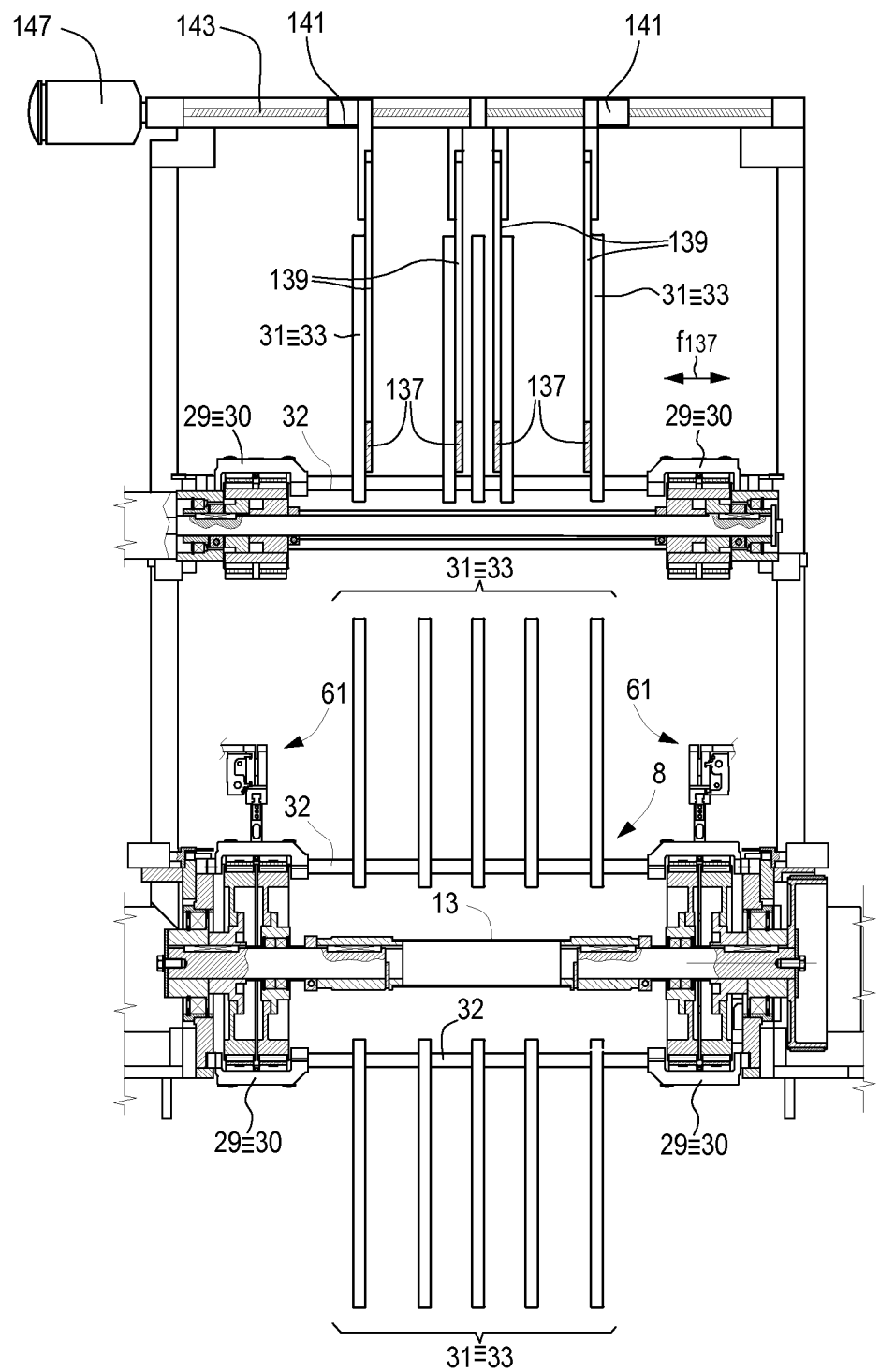
Figure 15C:
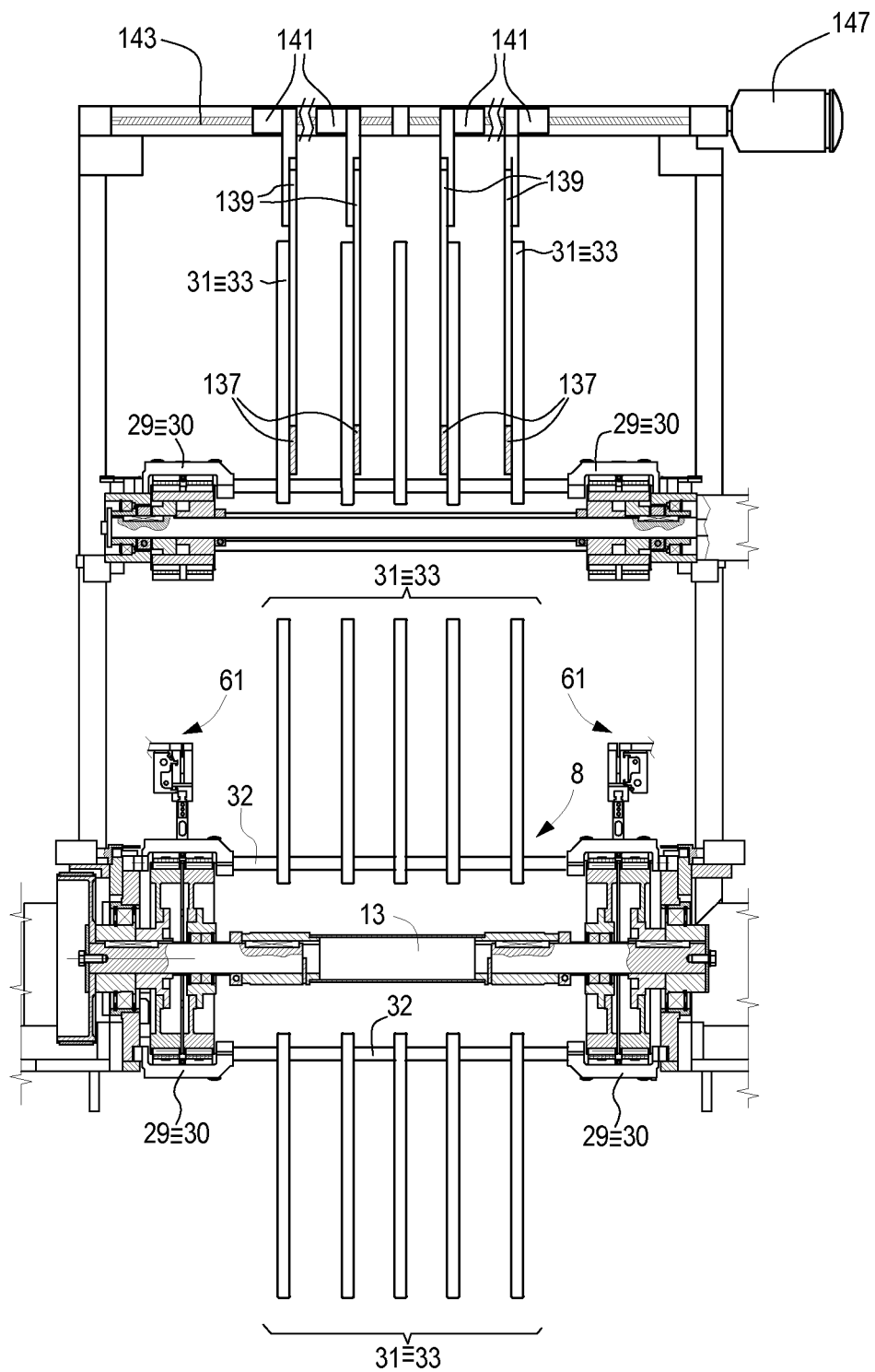

FIGS. 12 to 14 illustrate the main members of an embodiment of an adjustment device 134 for adjusting the mutual position of the fingers or prongs 31, 33 in a wrapping machine 1 having substantially the same or similar structure as the one already described with reference to the previous figures. The structure of the wrapping machine, of the magazine 5 and of the manipulators 61 will not be described again. FIGS. 15A-15C show an operating sequence of the adjustment device.

In the illustrated embodiment, the magazine 5 has only one section, but it must be understood that what is described here below with reference to the device for adjusting the mutual position of the fingers or prongs 31, 32 of the carriages 29, 30 can also be provided in a magazine 5 having a plurality of side by side or superimposed sections, as illustrated in FIGS. 10A-10H. In this case, an adjustment device can be provided for each section of the magazine.

Moreover, in the embodiment of FIGS. 15A-15C the manipulators 61 are only provided with translation movements, but in other embodiments, not shown, the adjustment device of the mutual distance of the fingers or prongs 31, 33 can be combined with manipulators adapted to carry out rotation movements of the carriages, as described with reference to FIGS. 11A-11H.

In the embodiment of FIGS. 12 to 14 the magazine 5 comprises a structure 135 located above the toothed belts 51, 53 and extending parallel thereto. The structure 135 supports the adjustment device 134. This latter can comprise a series of longitudinal elements or beams, hereinafter called linear members 137, which can have a longitudinal extension parallel to the belts 51,53 and substantially the same length as the longitudinal extension of the magazine 5. In other embodiments, not shown, the belts 51, 53 can have a different length than the linear members 137, for example a greater length.

As can be seen in particular in the plan view of FIG. 14 and in the views according to XV-XV of FIG. 13, shown in FIGS. 15A-15C, the number of linear members 137 can be the same as the number of fingers or prongs 31 or 33 with which each carriage 29 or 30 is provided, less one. In the embodiment illustrated by way of example in the drawings, each carriage 29 comprises five fingers 31, 33 and therefore the adjustment device 134 comprises four linear members 137.

Each linear member 137 can be supported by two or more uprights 139. The uprights 139 can have a lengthening and shortening movement according to the arrow f139, for the purposes described below. Moreover, each upright 139 can be constrained to a nut 141 meshing with a corresponding threaded bar 143. The threaded bars 143 can be divided into two portions, having threads in opposite directions, so that nuts 141 engaged on two distinct portions of the same threaded bar 141 move in opposite directions when the threaded bar 143 rotates. In the illustrated embodiment, as can be seen in particular in FIG. 14, four threaded bars 143 are provided, mounted on each of which are two nuts 141, associated with linear members 137 symmetrically arranged with respect to the centerline of the magazine 5. The reference numeral 147 indicates electric motors or other actuators adapted to control rotation of the threaded bars 143.

The arrangement is such that each linear member 137 is carried by two uprights 139, constrained to two threaded bars 143 spaced from each other. The outermost linear members 137 are mounted on two threaded bars 143 so that the rotation of these latter in one or in the other direction causes the respective linear members 137 to move toward or away from each other. The two innermost linear members 137 are supported by the remaining two threaded bars 143, whose rotation causes the innermost linear members 137 to move toward and away from each other. In this way it is possible to obtain the symmetrical movement of the external pair of linear members 137 and of the internal pair of linear members 137, simultaneously or in sequence, by activating the respective electric motors 147.

Operation of the adjustment device 134 described above is clearly illustrated in the sequence of FIGS. 15A-15C. In this sequence the fingers 31, 33 of all the carriages 29, 30 are moved away from each other. To carry out this operation the linear members 137 can initially be positioned when the magazine 5 is empty, or any carriages 29, 30 present in the magazine 5 can be moved into a section (not shown) of the magazine 5 that extends beyond the linear extension of the linear members 137. In this way the linear members 137 can be moved transversely (according to the double arrow f137) without colliding against the carriages 29, 30.

The linear members 137 are positioned so as to be interposed between adjacent fingers 31, 33, once the carriages 29, 30 are loaded on the magazine 5 or translated from a withdrawn position of the magazine 5 until they are aligned along the extension of the linear members 137.

FIG. 15A shows a situation in which the linear members 137 have been positioned between adjacent pairs of fingers 31, 33 of the carriages 29, 30. In the subsequent step (FIG. 15B) the outermost linear elements 137 can be translated outward moving the respective fingers 31, 33 of all the carriages 29, 30. Once this has taken place, it is possible to translate, in the same way, the innermost fingers or prongs 31, 33, as shown in FIG. 15C. In this embodiment the central finger or prong 31, 33 of each carriage 29, 30 remains in fixed position. Translation of the external and internal linear members 137 can also be simultaneous.

As the linear members 137 extend along the whole of the length of the magazine 5, or in any case for the length in which all the carriages 29, 30 to be subsequently loaded onto the conveyor device 8 can be accumulated, with the simple sequence illustrated in FIGS. 15A-15C it is possible to position the prongs or fingers 31, 33 of all the carriages 29, 30 all at once and in very short times. Moreover, the adjustment device 134 is in a withdrawn position with respect to the conveyor device 8 and does not interfere with the belts 53, 55 of the magazine 5. This simplifies maintenance or repair operations of the conveyor device 8 and also of the magazine 5.

In some embodiments the fingers or prongs 31, 33 of the single carriages 29, 30 can be reversibly fixed to cross bars 32 of the respective carriages 29, 30. The connection between the fingers or prongs 31, 33 and the bars 32 can be temporarily loosened to allow the fingers or prongs 31, 33 to translate along the bars 32 from an initial position to a final position by means of the positioning operations described above.

For this purpose, in some embodiments the linear members 137 can be used and configured to release the fingers with respect to the cross bars 32. For example, it is possible to design the base of the fingers or prongs 31, 33 in a manner known per se, and described in United States patents cited above.

FIG. 13 shows a possible embodiment of the carriages 29, 30, in which each finger or prong 31, 33 has two seats 151, 153 for constraining to the respective bars 32 of the carriage 29, 30. One of the two seats, and in particular the seat 151, can be elastically deformable acting by means of the same linear members 137 on appendages 156 that delimit the seats 151. For example, a lowering movement according to the arrow f139 of the single linear members 137 can cause the simultaneous opening, according to the arrow f156, of all the appendages 156 of the fingers 31, 33 aligned with the linear member 137. The previously mentioned telescopic lengthening of the uprights 139 is used to impart this vertical movement to the linear members 137. The movement can be very limited, as an opening of a few degrees of the appendages 156 is sufficient to loosen the fingers 31, 33 with respect to the bars 32, releasing the same fingers from the bars and allowing them to move to the new position.

In the illustrated embodiment the adjustment device 134 is placed above the belts 51, 53 and acts on the carriages 29, 30 from above. Nonetheless, it would also be possible to position the adjustment device below, for example to act on the carriages from below rather than from above. The first solution is less advantageous from the point of view of vertical overall dimension, but more advantageous from the point of view of access to the members forming the magazine 5 and the adjustment device 134.

The invention claimed is:

1. A wrapping machine comprising:
   a feed path of products to be wrapped in a wrapping sheet;
   along the feed path, an insertion station of products to be wrapped in the wrapping sheet and folding members of the wrapping sheet;
   a conveyor device, which receives the products in the insertion station and causes advancement thereof through the folding members; wherein the conveyor device comprises a system of endless flexible members that define a closed trajectory along which carriages, constrained to the flexible members and provided with prongs, move; wherein pairs of consecutive and adjacent carriages define compartments for accommodating products to be wrapped;
   a magazine of carriages associated with the system of endless flexible members; and
   manipulators adapted to pick up carriages from the magazine and attach the carriages to the system of endless flexible members, and to pick up the carriages from the system of endless flexible members and place the carriages in the magazine.

2. The wrapping machine of claim 1, wherein the magazine of carriages comprises an endless member, the carriages and the endless member being adapted to be mutually coupled.

3. The wrapping machine of claim 2, wherein the endless member of the magazine extends approximately parallel to the system of endless flexible members of the conveyor device.

4. The wrapping machine of claim 1, wherein the magazine is positioned above the conveyor device, and wherein the feed path of the products is arranged below the system of endless flexible members of the conveyor device.

5. The wrapping machine of claim 1, wherein the system of endless flexible members of the conveyor device comprises a first pair of flexible members and a second pair of flexible members, which extend along the closed trajectory; wherein a first series of carriages is constrained to the first pair of flexible members and a second series of carriages is constrained to the second pair of flexible members; and wherein the carriages of the first series of carriages and the carriages of the second series of carriages are arranged alternated with each other along the closed trajectory, so that each of the compartments for accommodating the products to be wrapped is defined by a carriage of the first series of carriages and by a carriage of the second series of carriages and by the respective prongs.

6. The wrapping machine of claim 5, wherein the first pair of flexible members and the second pair of flexible members are adjustable to modify a mutual distance between pairs of the carriages and the respective prongs that form each of the compartments, to modify size of the compartment in a direction of feed of the products along the feed path.

7. The wrapping machine of claim 1, wherein each of the carriages comprises elements for reversible coupling to said flexible members.

8. The wrapping machine of claim 1, further comprising a guide system of the carriages, said guide system extending along the closed trajectory defined by the flexible members; and wherein the carriages are provided with engagement elements to the guide system.

9. The wrapping machine of claim 8, wherein the guide system comprises two opposite channels, one positioned on each side of the system of endless flexible members, and each of the carriages comprises engagement elements to the two opposite channels.

10. The wrapping machine of claim 9, wherein the engagement elements comprise, for each of the carriages, at least one roller for each of the channels of the guide system.

11. The wrapping machine of claim 9, wherein each of the channels of the guide system comprises an opening for removing and inserting the carriages, associated with the manipulators.

12. The wrapping machine of claim 1, wherein contrasting surfaces, positioned inside the closed trajectory, on which the flexible members rest and slide, are arranged along at least a portion of the closed trajectory defined by the system of endless flexible members.

13. The wrapping machine of claim 1, wherein said flexible members comprise toothed belts guided around toothed wheels, each of the toothed belts comprising a first series of internal teeth, cooperating with the toothed wheels.

14. The wrapping machine of claim 13, wherein each of the toothed belts comprises a second series of external teeth, cooperating with connection elements of the carriages.

15. The wrapping machine of claim 14, wherein each of the carriages comprises teeth complementary to the external teeth of the toothed belts forming the flexible members, to which the carriage is constrained; wherein the complementary teeth are adapted to provide a shape coupling with the teeth of respective toothed belts.

16. The wrapping machine of claim 15, wherein the magazine comprises an endless member wherein the endless member comprises internal teeth and external teeth, the external teeth co-acting with the complementary teeth of the carriages to provide mutual coupling between the endless member of the magazine and the carriages.

17. The wrapping machine of claim 16, wherein the endless member of the magazine comprises a number of belts corresponding to the number of belts that form the system of endless flexible members of the conveyor device.

18. The wrapping machine of claim 1, wherein said manipulators comprise grippers movable according to two orthogonal translation axes.

19. The wrapping machine of claim 1, further comprising an adjustment device to adjust a mutual distance of the prongs of the carriages, associated with the magazine of carriages.

20. The wrapping machine of claim 19, wherein the adjustment device comprises a plurality of mutually parallel linear members, extending along a direction of alignment of the carriages in the magazine, and adapted to move orthogonally to a linear extension of the linear members, parallel to a direction of alignment of the prongs of each of the carriages.

21. The wrapping machine of claim 20, wherein the linear members extend parallel to the endless member of the magazine of carriages.

22. The wrapping machine of claim 1, further comprising a rotation device, adapted to rotate the carriages about an axis orthogonal to a direction of alignment of the prongs.

23. The wrapping machine of claim 22, wherein the rotation device forms a part of the manipulators.

24. The wrapping machine of claim 1, wherein the magazine comprises two adjacent sections, to accommodate a first series of carriages and a second series of carriages; and wherein the manipulators are adapted to selectively reach one or other of said two adjacent sections.

25. The wrapping machine of claim 24, wherein the two adjacent sections of the magazine are superimposed on each other and on the conveyor device.

26. A method for setting up the wrapping machine of claim 1, comprising steps as follows:
   determining a number of the carriages and a mutual distance between the carriages to be attached to the system of endless flexible members, as a function of at least one feature of packs of products to be formed with said wrapping machine;
   transferring from the magazine to the system of endless flexible members or vice versa one or more of the carriages and constraining said carriages to the flexible members or to the magazine.

27. The method of claim 26, further comprising one or more steps as follows:
   picking up by the manipulators a plurality of the carriages from the system of endless flexible members and transferring the carriages to the magazine;
   modifying by the manipulators a position of the carriages arranged on the endless flexible members;
   picking up by the manipulators a plurality of the carriages from the magazine and transferring the carriages to the system of endless flexible members.

28. The method of claim 26, further comprising one or more steps as follows:
   picking up by the manipulators the carriages from the system of endless flexible members and transferring the carriages to the magazine, wherein either all of the carriages are picked up and transferred to the magazine or at least one of the carriages remains constrained to the flexible members;
   picking up by the manipulators a plurality of the carriages from the magazine and transferring the carriages to the system of endless flexible members and arranging the carriages according to predetermined pitches as a function of said at least one feature of the packs of products to be formed.

29. The method of claim 26, further comprising steps as follows:
   transferring all the carriages located on the endless flexible members to the magazine by the manipulators;
   adjusting mutual distance of the prongs of the carriages;
   re-transferring at least a part of the carriages from the magazine to the endless flexible members by the manipulators.

30. The method of claim 26, further comprising steps as follows:
   transferring at least some of the carriages from the endless flexible members to the magazine;
   transferring at least some of the carriages from the magazine to the endless flexible members and rotating the carriages through 180° about an axis orthogonal to active branches of the endless flexible members and to an extension of the carriages in a direction orthogonal to a direction of movement of the endless flexible members.

31. The method of claim 26, further comprising steps as follows:
   transferring all the carriages located on the endless flexible members to a first section of the magazine by the manipulators;
   picking up the carriages from a second section of the magazine and transferring the carriages to the endless flexible members by the manipulators.

* * * * *